United States Patent
Wada et al.

(10) Patent No.: US 12,211,380 B2
(45) Date of Patent: Jan. 28, 2025

(54) LANE CHANGE ROUTE INSTRUCTING DEVICE AND LANE CHANGE ROUTE INSTRUCTING SYSTEM

(71) Applicant: Mitsubishi Electric Corporation, Tokyo (JP)

(72) Inventors: Yuta Wada, Tokyo (JP); Masuo Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 303 days.

(21) Appl. No.: 17/630,191

(22) PCT Filed: Aug. 28, 2019

(86) PCT No.: PCT/JP2019/033645
§ 371 (c)(1),
(2) Date: Jan. 26, 2022

(87) PCT Pub. No.: WO2021/038741
PCT Pub. Date: Mar. 4, 2021

(65) Prior Publication Data
US 2022/0277651 A1 Sep. 1, 2022

(51) Int. Cl.
*G08G 1/0967* (2006.01)
*B60W 30/095* (2012.01)
(Continued)

(52) U.S. Cl.
CPC ... *G08G 1/096725* (2013.01); *B60W 30/0956* (2013.01); *B60W 30/18163* (2013.01);
(Continued)

(58) Field of Classification Search
CPC .............. G08G 1/096725; G08G 1/16; B60W 30/0956; B60W 30/18163; B60W 2556/45; B60W 2720/106
See application file for complete search history.

(56) References Cited

U.S. PATENT DOCUMENTS

2017/0345309 A1* 11/2017 Bostick ............... G05D 1/0289
2018/0039844 A1* 2/2018 Nordbruch ............. B60T 7/12
(Continued)

FOREIGN PATENT DOCUMENTS

CN 105761549 A 7/2016
CN 106601002 A 4/2017
(Continued)

OTHER PUBLICATIONS

Office Action dated May 19, 2023 from the European Patent Office in Application No. 19 943 159.4.
(Continued)

*Primary Examiner* — Andrew J Cromer
(74) *Attorney, Agent, or Firm* — Sughrue Mion, PLLC; Richard C. Turner

(57) ABSTRACT

The present disclosure provides a lane change route instructing device and a lane change route instructing system such that, by considering the necessity of a lane change of a multiple of vehicles existing in a periphery, a coinciding of travel routes accompanying a lane change is avoided, and the vehicles can be caused to carry out a traveling operation smoothly. A lane change route instructing device determines whether or not target travel routes of each vehicle will coincide with each other in accompaniment to a lane change, determines an inter-vehicle priority relating to a lane change, and when it is determined that a coinciding of the target travel routes will occur, transmits a command to maintain the target travel route to a highest priority coinciding vehicle among coinciding vehicles whose target travel routes have been determined to be going to coincide with each other, and transmits a command for evasive travel that avoids a coinciding with the target travel route of the highest priority coinciding vehicle to a low priority coinciding vehicle.

21 Claims, 20 Drawing Sheets

(51) Int. Cl.
  *B60W 30/18* (2012.01)
  *G08G 1/16* (2006.01)
(52) U.S. Cl.
  CPC ........... *G08G 1/16* (2013.01); *B60W 2556/45* (2020.02); *B60W 2720/106* (2013.01)

(56) References Cited

U.S. PATENT DOCUMENTS

2018/0061236 A1    3/2018  Yamamoto
2018/0327029 A1*  11/2018  Oooka ................... G08G 1/163

FOREIGN PATENT DOCUMENTS

WO    2016/147623 A1    9/2016
WO    2019/138488 A1    7/2019

OTHER PUBLICATIONS

European Office Action dated Sep. 14, 2023 in Application No. 19 943 159.4.
International Search Report for PCT/JP2019/033645 dated Nov. 5, 2019.
Written Opinion for PCT/JP2019/033645 dated Nov. 5, 2019.
Office Action issued Apr. 19, 2022 in Japanese Application No. 2021-541860.
Extended European Search Report dated Jul. 25, 2022 in European Application No. 19943159.4.
European Office Action issued Mar. 6, 2024 in Application No. 19 943 159.4.
Chinese Office Action dated Jan. 11, 2024 in Chinese Application No. 201980097870.6.

* cited by examiner

| TIME | LATITUDE | LONGITUDE | VEHICLE SPEED | VEHICLE ORIENTATION |
|---|---|---|---|---|
| 10:51:40:000 | 135.000000 | 35.123341 | 60.38 | 0.00088 |
| 10:51:40:100 | 135.002311 | 35.123343 | 60.49 | 0.00142 |
| 10:51:40:200 | 135.004623 | 35.123347 | 60.29 | 0.00263 |
| 10:51:40:300 | 135.006934 | 35.123353 | 60.32 | 0.00596 |
| 10:51:40:400 | 135.009245 | 35.123366 | 60.40 | 0.01454 |
| 10:51:40:500 | 135.011557 | 35.123400 | 60.59 | 0.01454 |
| 10:51:40:600 | 135.013868 | 35.123434 | 60.16 | 0.00596 |
| 10:51:40:700 | 135.016179 | 35.123447 | 60.23 | 0.00263 |
| 10:51:40:800 | 135.018491 | 35.123453 | 60.00 | 0.00142 |
| 10:51:40:900 | 135.020802 | 35.123457 | 60.01 | 0.00088 |
| 10:51:41:000 | 135.023113 | 35.123459 | 60.50 | 0.00000 |

| SMALL GROUP IDENTIFICATION CODE | VEHICLE IDENTIFICATION CODE |
|---|---|
| 0 | 321-0909 |
| 0 | 421-3210 |
| 0 | 213-3211 |
| 1 | 312-4130 |
| 1 | 321-3114 |
| 1 | 312-3124 |
| 1 | 411-3121 |
| 2 | 132-3129 |
| 3 | 312-3129 |
| 4 | 319-3210 |
| 4 | 321-4219 |

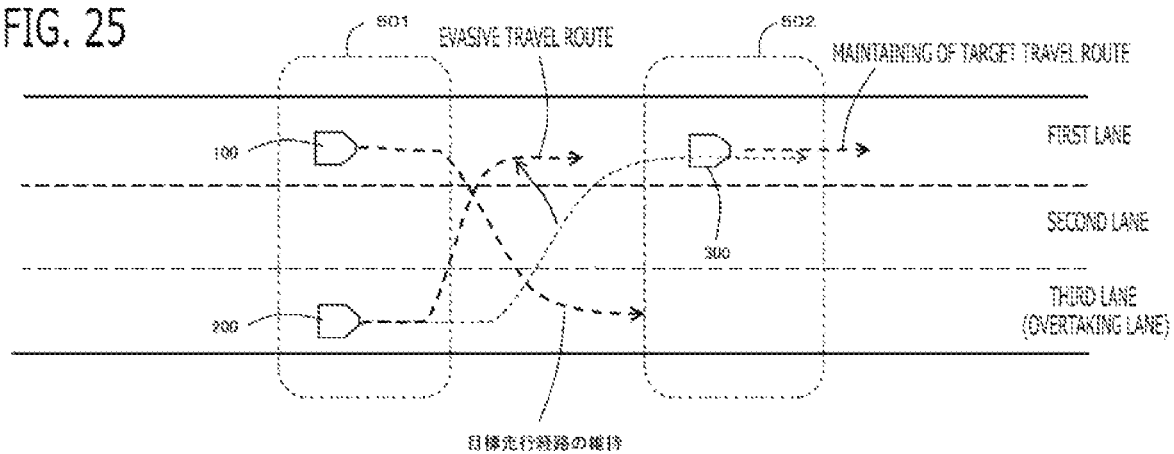
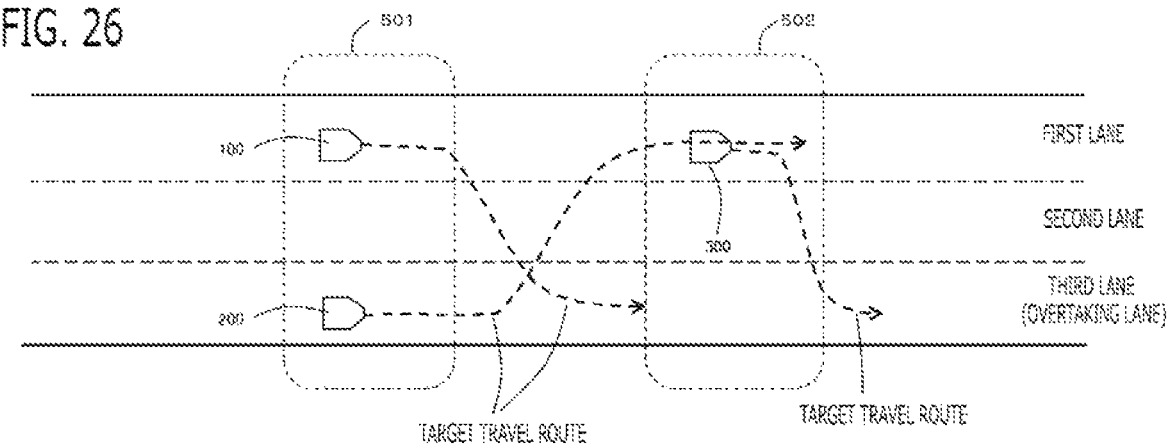

LANE CHANGE ROUTE INSTRUCTING DEVICE AND LANE CHANGE ROUTE INSTRUCTING SYSTEM

CROSS REFERENCE TO RELATED APPLICATIONS

This application is a National Stage of International Application No. PCT/JP2019/033645 filed Aug. 28, 2019.

TECHNICAL FIELD

The present disclosure relates to a lane change route instructing device and to a lane change route instructing system.

BACKGROUND ART

Technology such that, when a vehicle changes lane or merges using self-driving, an actual traveling operation is carried out after first carrying out inter-vehicle communication between vehicles, thereby communicating safety confirmation, is disclosed in PLT 1.

CITATION LIST

Patent Literature

PLT 1: WO 2016/147623 A

SUMMARY OF INVENTION

Technical Problem

The technology of PLT 1 is configured in such a way that a vehicle that carries out a lane change transmits a lane change request to a vehicle traveling in a lane that is a lane change destination. However, the technology of PLT 1 is such that a vehicle that receives a lane change request only evaluates the safety of its own traveling and permits a lane change, and does not evaluate safety in a broader perspective by considering behavior of a third party vehicle.

Because of this, the technology of PLT 1 is such that when, for example, a first vehicle traveling in a first traveling lane and a third vehicle traveling in a third traveling lane simultaneously plan a lane change to a second traveling lane, and a transmit a request to change lane to the second traveling lane to a second vehicle traveling in the second traveling lane, there is a possibility that the second vehicle, when able to travel safely itself, will permit the first vehicle and the third vehicle to change lane. Because of this, there is a possibility that the first vehicle and the second vehicle, which have simultaneously changed lane to the second traveling lane, will come into proximity, and a sudden evasive operation will be necessary.

Also, the necessity to carry out a lane change differs depending on a vehicle, such as a vehicle that carries out a merging or a diverging, a vehicle that avoids an obstacle, or an emergency vehicle. Because of this, there is a need to allow a vehicle with a high necessity to change lane to change lane with priority.

Therefore, there is a demand for a lane change route instructing device and a lane change route instructing system such that, by considering the necessity of a lane change, in a broad perspective, of a multiple of vehicles existing in a periphery, a coinciding of travel routes accompanying a lane change is avoided, and the vehicles can be caused to carry out a traveling operation smoothly.

Solution to Problem

A first lane change route instructing device according to the present disclosure includes a communication unit that communicates with a multiple of vehicles, a target route receiving unit that receives a target travel route from each vehicle, a route coinciding determining unit that determines whether or not the target travel routes of each vehicle will coincide with each other in accompaniment to a lane change, a priority determining unit that determines inter-vehicle priority relating to a lane change, and a route command unit that transmits a travel route command to each vehicle, wherein, when it is determined that a coinciding of the target travel routes will occur, the route command unit transmits a command to maintain the target travel route to a highest priority coinciding vehicle, which is a vehicle for which the priority is highest among coinciding vehicles whose target travel routes have been determined to be going to coincide with each other, and transmits a command for evasive travel that avoids a coinciding with the target travel route of the highest priority coinciding vehicle to a low priority coinciding vehicle, which is a vehicle other than the highest priority coinciding vehicle among the coinciding vehicles.

A second lane change route instructing device according to the present disclosure includes a communication unit that communicates with a multiple of vehicles, a target route receiving unit that receives a target travel route from each vehicle, a route coinciding determining unit that determines whether or not the target travel routes of each vehicle will coincide with each other in accompaniment to a lane change, and a route command unit that transmits a travel route command to each vehicle, wherein, when it is determined that a coinciding of the target travel routes will not occur, the route command unit transmits a command to maintain the target travel route to each vehicle.

A lane change route instructing system according to the present disclosure includes the lane change route instructing device, and a multiple of vehicles that fix the target travel route, transmit the target travel route to the lane change route instructing device, and carry out self-driving in accordance with the travel route command received from the lane change route instructing device.

Advantage of Invention

According to the first lane change route instructing device of the present disclosure, or to the lane change route instructing system including the first lane change route instructing device, a coinciding of travel routes accompanying a lane change is determined, in a broad perspective, based on target travel routes of a multiple of vehicles. Further, inter-vehicle priority relating to a lane change is determined, a highest priority coinciding vehicle, which has the highest priority, can be caused to maintain the target travel route, and a low priority coinciding vehicle can be caused to carry out evasive travel that avoids coinciding with the target travel route of the highest priority coinciding vehicle. Therefore, a coinciding of travel routes is avoided in a broad perspective, and each vehicle can be caused to carry out a smooth traveling operation. Also, as the travel route of a high priority vehicle is prioritized, a flow of vehicles in a traffic system can be smoothened, and a vehicle with a high degree of urgency can be caused to travel with priority.

According to the second lane change route instructing device of the present disclosure, or to the lane change route instructing system including the second lane change route instructing device, each vehicle is caused to maintain a target travel route when no coinciding will occur, because of which there is no impediment to an autonomous traveling of each vehicle, and a flow of vehicles in a traffic system can be smoothened.

BRIEF DESCRIPTION OF THE DRAWINGS

FIG. 25 is a schematic view for describing a travel route determination according to the third embodiment.

FIG. 26 is a schematic view for describing a travel route determination according to the third embodiment.

DETAILED DESCRIPTION OF THE EMBODIMENTS

1. First Embodiment

Figure 1:
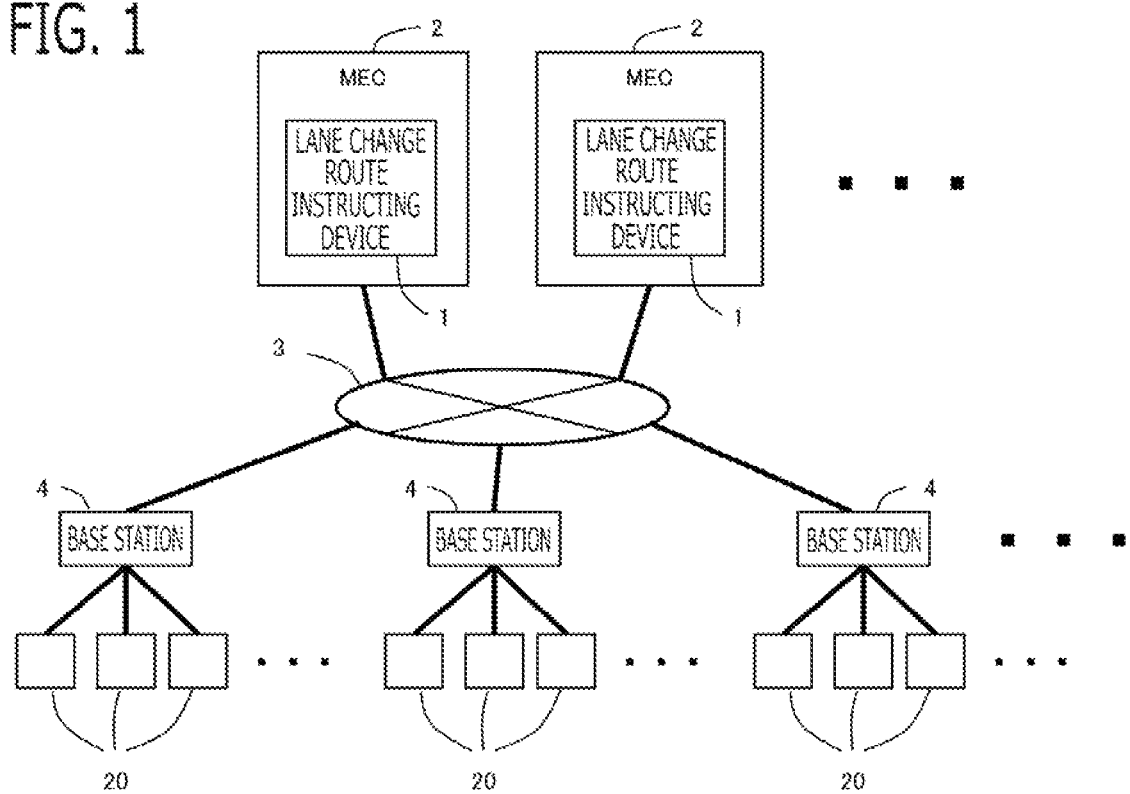
FIG. 1 is a schematic configuration drawing of a lane change route instructing system according to a first embodiment.

A lane change route instructing device 1 according to a first embodiment, and a lane change route instructing system including a multiple of vehicles 20 whose travel routes are managed by the lane change route instructing device 1, will be described with reference to the drawings. FIG. 1 is a drawing showing a schematic overall configuration of the lane change route instructing system.

The lane change route instructing device 1 is provided in a server 2 connected to a network 3. That is, a function of the lane change route instructing device 1 is realized by the server 2 executing an application (a program) of the lane change route instructing device 1. In the present embodiment, a multiple of the lane change route instructing device 1 are provided, and travel routes of a multiple of vehicles are divided among the multiple of lane change route instructing devices 1 and managed. Also, the server 2 is, for example, an MEC (mobile edge computing) server. Details of MEC are described in, for example, Document (ETSI GS MEC 003 V2.1.1 (2019-01). The network 3 is, for example, a core network. The lane change route instructing device 1 and the server 2 may be installed near a region to be managed.

Each vehicle 20 is connected to a nearby base station 4 via wireless communication. A multiple of base stations 4 are provided dispersed among points in order to be able to cover a road network. The base station 4 is a wireless station that carries out wireless communication with a mobile terminal instrument mounted in a vehicle existing within a communication area, using a cellular wireless communications standard such as 4G or 5G, and is connected to the network 3. Therefore, each vehicle 20 and the lane change route instructing device 1 are communicatively connected via the base station 4 and the network 3.

1-1. Vehicle Configuration

Figure 2:
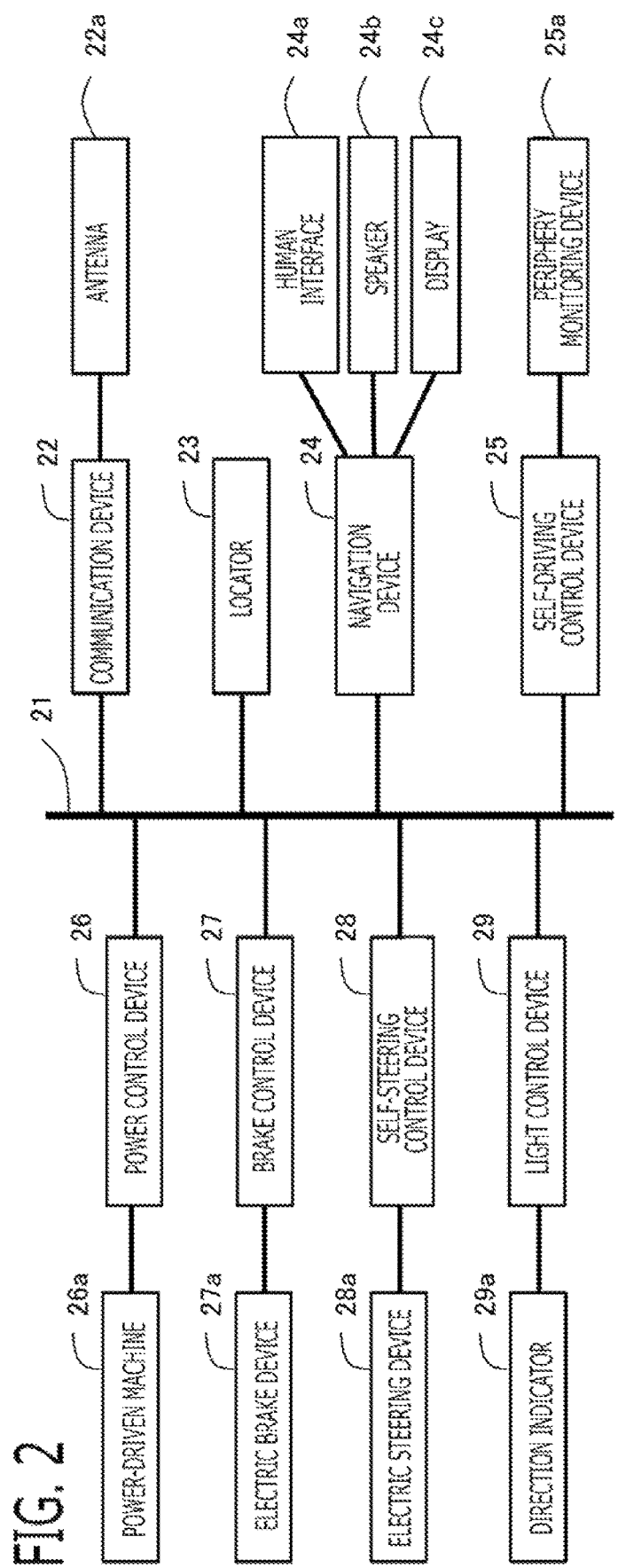
FIG. 2 is a schematic configuration drawing of a vehicle system according to the first embodiment.

FIG. 2 shows a schematic configuration of a system mounted in each vehicle 20. Each vehicle 20 includes a vehicle-mounted network 21, a communication device 22, a locator 23, a navigation device 24, a self-driving control device 25, a power control device 26, a brake control device 27, a self-steering control device 28, a light control device 29, and the like.

The vehicle-mounted network 21 is a network that carries out reciprocal communication among the vehicle-mounted devices 22 to 29. For example, a communications standard such as a CAN (controller area network), Ethernet, or FlexRay (both registered trademarks) is used.

The communication device 22 is a communication device that carries out wireless communication with the base station 4 existing within a communication area using an antenna 22a, and carries out a communication of data with the lane change route instructing device 1. Also, the communication device 22 may communicate with a nearby vehicle.

The locator 23 is a device that recognizes a position of a host vehicle, and has a GPS antenna, an acceleration sensor, a direction sensor, and the like. The locator 23 matches host vehicle positional information (latitude, longitude, altitude) obtained from the GPS antenna or the like, information obtained from a periphery monitoring device 25a, and the like, and high accuracy map data, thereby recognizing highly accurate host vehicle positional information.

The navigation device 24 fixes a target route from a current position to a target point based on a host vehicle current position, a target point, map data, and a road situation obtained from the locator 23. The navigation device 24 includes a human interface 24a, and receives a setting of a target point by a vehicle occupant. The navigation device 24 can output navigation-related information to a speaker 24b and a display 24c, thereby providing the information to a vehicle occupant.

Figures 3, 4:
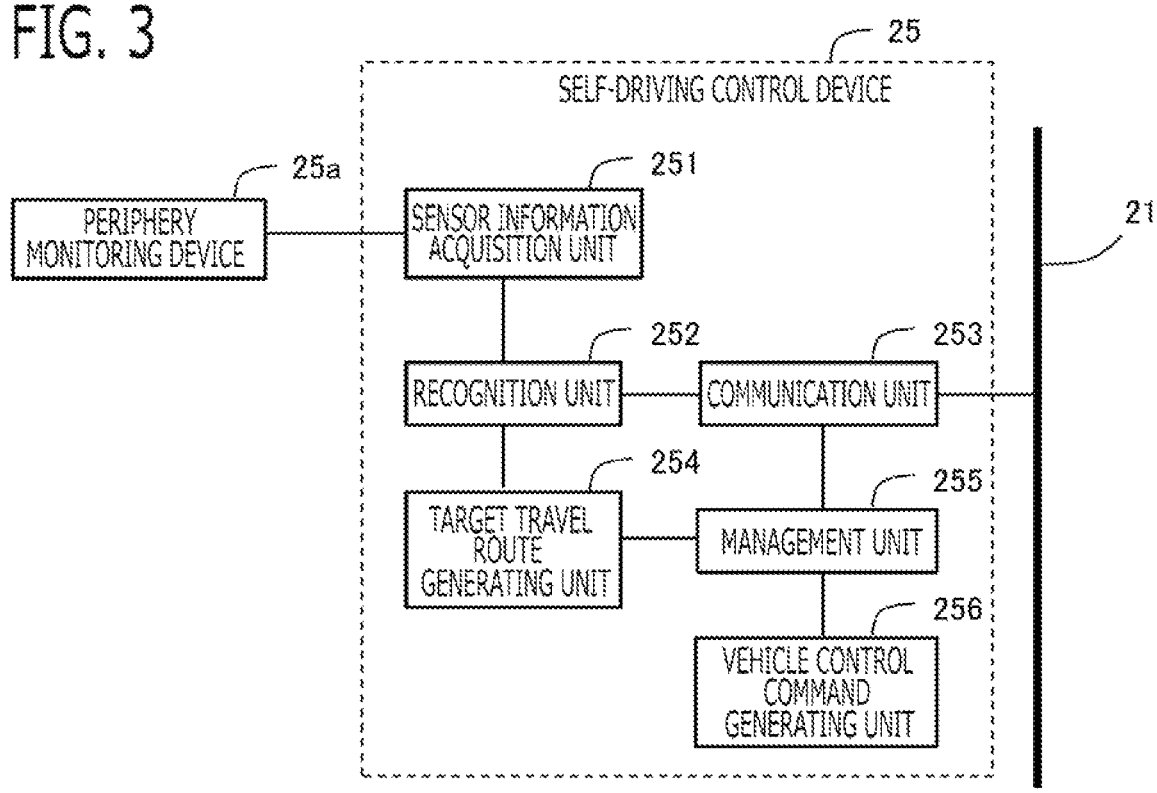
FIG. 3 is a schematic configuration drawing of a self-drive control device according to the first embodiment.
FIG. 4 is a drawing for describing transmitted target travel route data according to the first embodiment.

The self-driving control device 25 is a device that carries out recognition, evaluation, and control for self-driving. As shown in FIG. 3, the self-driving control device 25 includes a sensor information acquisition unit 251, a recognition unit 252, a communication unit 253, a target travel route generating unit 254, a management unit 255, a vehicle control command generating unit 256, and the like. The communication unit 253 communicates with another vehicle-mounted device via the vehicle-mounted network 21. The sensor information acquisition unit 251 acquires information from the periphery monitoring device 25a. The periphery monitoring device 25a is a camera, radar, or the like, that monitors the periphery of the host vehicle. Millimeter wave radar, laser radar, ultrasonic radar, or the like, is used as the radar.

The recognition unit 252 recognizes a traveling state of a peripheral vehicle and a peripheral traveling situation such as a state of a traveling road based on host vehicle positional information, high accuracy map data, and peripheral information obtained from the periphery monitoring device 25a. A position, a speed, a direction of travel, a traveling lane, a size, a category, and the like, of a peripheral vehicle are recognized as a traveling state of a peripheral vehicle. A form of a road, a lane, an existence or otherwise of an obstacle, an existence or otherwise of a pedestrian, road sign information, a road traffic rule such as a section in which a lane change is prohibited, signal information, traffic jam information, and the like, are recognized as a state of a traveling road.

Also, the target travel route generating unit 254 fixes a short distance target travel route that is in accordance with a recognized peripheral travel situation in order to travel along a target route to a target point set by the navigation device 24. A short distance target travel route is a target travel route from the current point to a point predetermined distance forward or until a predetermined time ahead. How far in the future a target travel route is fixed is arbitrary, but as an example, a target travel route within a range corresponding to a range that can be detected by the periphery monitoring device 25a is fixed.

For example, when another vehicle, an obstacle, a pedestrian, or the like is detected ahead of the host vehicle by the periphery monitoring device 25a, the target travel route generating unit 254 fixes a target travel route such as that contact with the other vehicle, the obstacle, the pedestrian, or the like is avoided. Also, when a road form differing from the high accuracy map data is recognized by the periphery monitoring device 25a, the target travel route generating unit 254 fixes a target travel route that is in accordance with the recognized road form. Also, when sign information or signal information is recognized by the periphery monitoring device 25a, the target travel route generating unit 254 fixes a target travel route that is in accordance with the recognized sign information or signal information. Also, when there is no need to change a target route set by the navigation device 24, the target travel route generating unit 254 fixes a target travel route that is in accordance with the travel route of the navigation device 24.

As will be described hereafter, a travel route of a vehicle with low priority is changed by the lane change route instructing device 1, because of which the target travel route generating unit 254 need not necessarily fix a target travel route with consideration to the traveling situation of another vehicle in the periphery.

A target travel route is a chronological travel plan for a vehicle position, a vehicle direction of travel, a vehicle speed, a traveling lane, a position at which a lane change is carried out, and the like, at each time in the future. The management unit 255 transmits a fixed target travel route to the lane change route instructing device 1 via the communication device 22. For example, the management unit 255 transmits chronological data such as a vehicle position (latitude, longitude, altitude), a vehicle speed, and a vehicle orientation at each time as target travel route data. FIG. 4 shows an example of target travel route chronological data. In the example of FIG. 4, the chronological data are formed of a time, a latitude, a longitude, a vehicle speed, and a vehicle orientation (for example, an orientation in a front-back direction of the vehicle).

Basic information relating to a vehicle is included in target travel route data to be transmitted. As basic information, there is a vehicle category (for example, an ambulance, a police car, a fixed-route bus, a cargo vehicle, a taxi, a general passenger car, a two-wheeled vehicle), a vehicle outline form, vehicle information (for example, a vehicle performance, a vehicle state, a number of occupants), and information relating to a degree of urgency of the vehicle.

Also, when transfer permission stating that a travel route may be transferred to another vehicle has been set, the management unit 255 transmits transfer permission information to the lane change route instructing device 1 together with target travel route data. Transfer permission is set by an occupant via the human interface 24a or the like, or set as default in the vehicle.

Also, the management unit 255 may transmit a waiting time for which a determination delay unit 45 of the lane change route instructing device 1, to be described hereafter, waits for a reception of a target travel route to the lane change route instructing device 1 together with target travel route data. For example, a waiting time transmitted by the management unit 255 is set as a difference between a time farthest in the future at which the target travel route is due to be traveled and the current time.

As will be described, the lane change route instructing device 1 determines what a travel route of each vehicle is to be based on a received target travel route of the respective vehicle, and transmits a travel route command to each vehicle. The self-driving control device 25 carries out self-driving of the vehicle in accordance with a travel route command received from the lane change route instructing device 1. When a travel route command received from the lane change route instructing device 1 is a change from a transmitted target travel route, the management unit 255 notifies the vehicle control command generating unit 256 of a travel route set based on the travel route command. For example, when a received travel route command is a lane maintaining command to maintain a current traveling lane, the management unit 255 fixes a travel route such that the current traveling lane is maintained, and notifies the vehicle control command generating unit 256 of the travel route. Also, when a received travel route command is an evasive travel route, the management unit 255 notifies the vehicle control command generating unit 256 of the evasive travel route.

Meanwhile, when a travel route command received from the lane change route instructing device 1 is a command to maintain a transmitted target travel route, the management unit 255 notifies the vehicle control command generating unit 256 of a target travel route generated by the target travel route generating unit 254.

When a reason for changing a target travel route is received from the lane change route instructing device 1, the management unit 255 informs an occupant of the reason for change via the communication unit 253 and the navigation device 24 using one or both of the speaker 24b and the display 24c.

The vehicle control command generating unit 256 fixes a target speed, a target steering angle, a direction indicator operation command, and the like, in order to travel in accordance with a travel route command notified of by the management unit 255, issues a command relating to the target speed to the power control device 26 and the brake control device 27, issues a command relating to the target steering angle to the self-steering control device 28, and issues a command relating to the direction indicator operation command to the light control device 29.

The power control device 26 controls an output of a power-driven machine 26a, such as an internal combustion engine or a motor, in such a way that the speed of the host vehicle complies with the target speed. The brake control device 27 controls a braking operation of an electric brake device 27a in such a way that the speed of the host vehicle complies with the target speed. The self-steering control device 28 controls an electric steering device 28a in such a way that a steering angle complies with the target steering angle. The light control device 29 controls a direction indicator 29a in accordance with the direction indicator operation command.

When an emergency evasive operation, such as preventing a collision with another vehicle, an obstacle, or a pedestrian, is needed in accordance with a peripheral traveling situation obtained from the periphery monitoring device 25a or the like, the self-driving control device 25 autonomously carries out evasive self-driving.

As configurations of vehicles having a self-driving function differ depending on a vehicle manufacturer, a configuration may differ from the configuration described in the present disclosure, but provided that a vehicle at least has functions of notifying the lane change route instructing device 1 of a target travel route, and carrying out self-driving in accordance with a travel route command notified of by the lane change route instructing device 1, the lane change route instructing system of the present disclosure can be configured.

Self-Driving Control Device 25 Hardware Configuration Example

Figure 31:
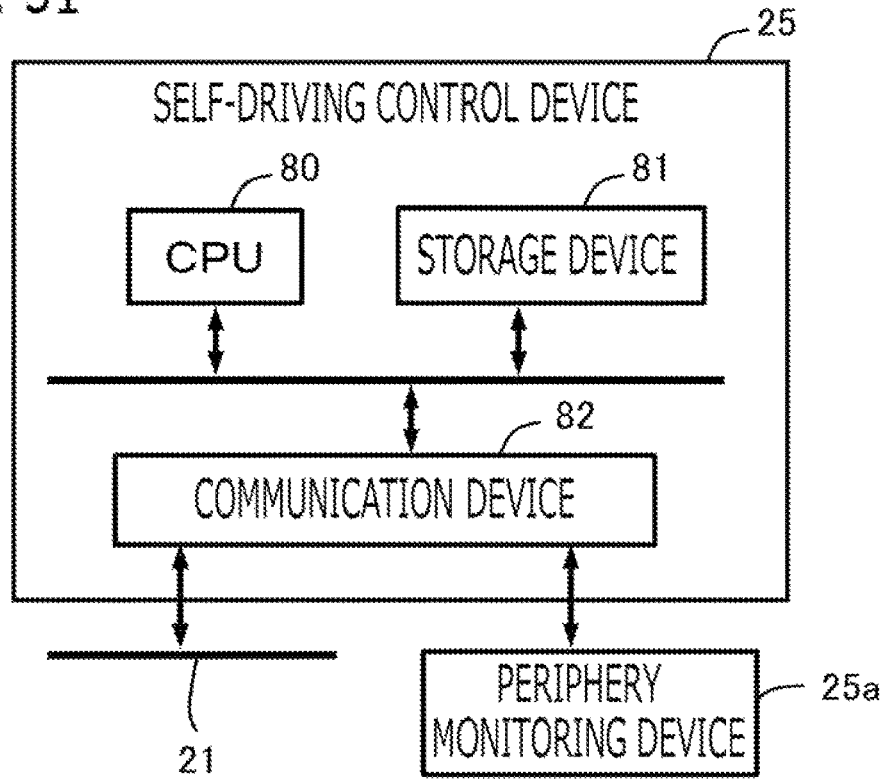
FIG. 31 is a hardware configuration drawing of the self-drive control device according to the first embodiment.

Each function of the self-driving control device 25 is realized by a processing circuit included in the self-driving control device 25. As shown in FIG. 31, the self-driving control device 25 includes an arithmetic processing device 80 (a computer) such as a CPU (central processing unit), a storage device 81 such as a RAM (random access memory), a ROM (read-only memory), or a hard disk (HDD), a communication device 82 that carries out data communication, and the like. In each embodiment, the communication device 82 is connected to the vehicle-mounted network 21, the periphery monitoring device 25a, and the like, and carries out data communication.

A program or the like for each function is stored in the storage device 81, such as a hard disk, of the self-driving control device 25. Each process of the self-driving control device 25 is realized by the arithmetic processing device 80 executing a program (software) stored in the storage device 81, and operating in conjunction with other hardware such as the storage device 81 and the communication device 82.

Self-Driving Control Device 25 Flowchart

Figure 5:
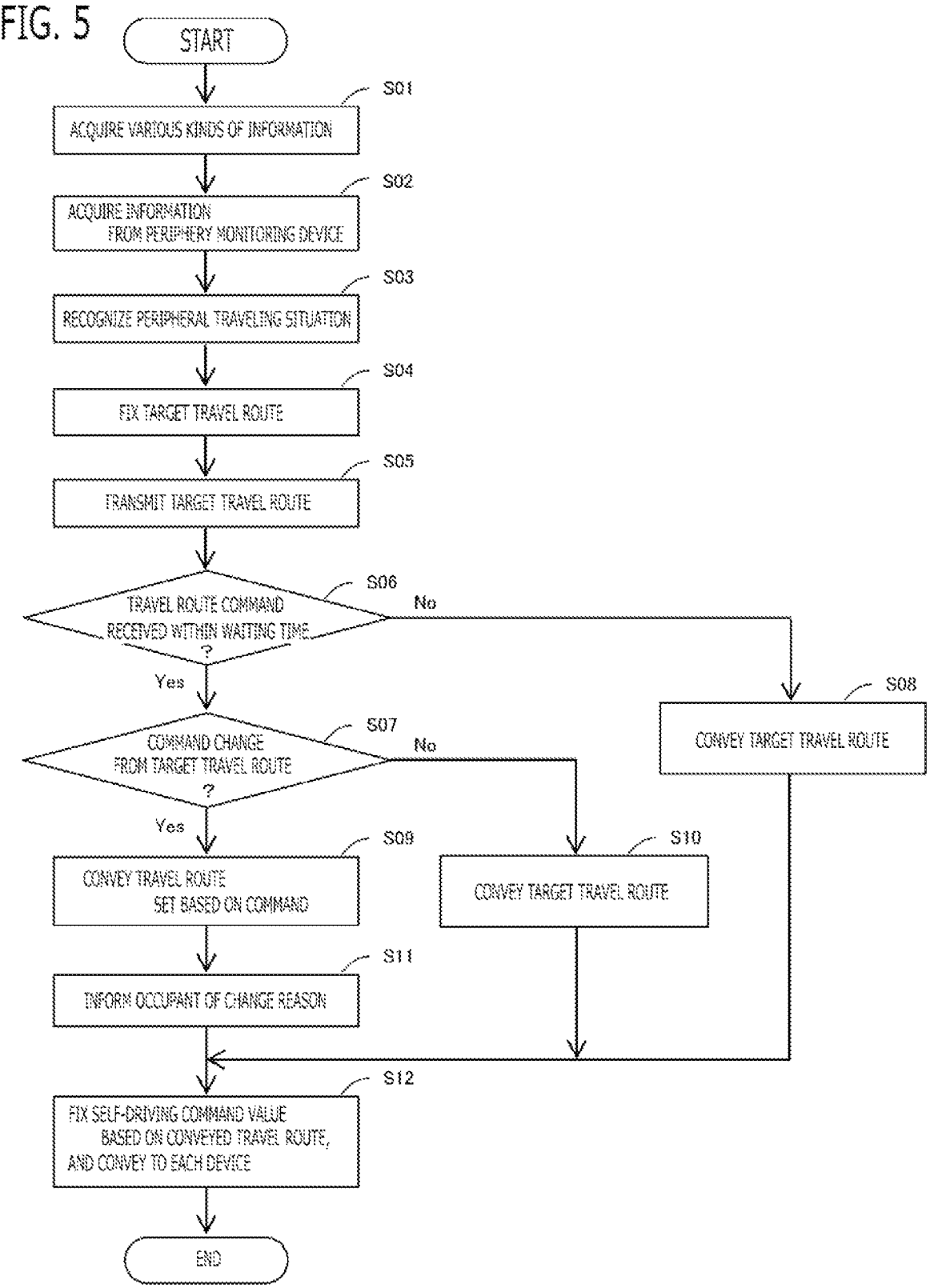
FIG. 5 is a flowchart illustrating a process of the self-drive control device according to the first embodiment.

Next, a process of the self-driving control device 25 will be described using a flowchart of FIG. 5. A process of the flowchart of FIG. 5 is, for example, executed repeatedly every constant computing cycle.

In step S01, as heretofore described, the communication unit 253 communicates with another vehicle-mounted device, such as the navigation device 24 or the locator 23, via the vehicle-mounted network 21, and acquires information such as a target route to a target point, host vehicle positional information, and high accuracy map data. The communication unit 253 communicates at an appropriate time and as necessary.

In step S02, as heretofore described, the sensor information acquisition unit 251 acquires information from the periphery monitoring device 25a. In step S03, as heretofore described, the recognition unit 252 recognizes a peripheral travel situation, such as a traveling state of a peripheral vehicle and a state of a traveling road, based on the host vehicle positional information, the high accuracy map data, and the peripheral information obtained from the periphery monitoring device 25a.

In step S04, as heretofore described, the target travel route generating unit 254 fixes a short distance target travel route that is in accordance with the recognized peripheral travel situation in order to travel along a target route to a target point set by the navigation device 24.

In step S05, as heretofore described, the management unit 255 transmits the target travel route fixed by the target travel route generating unit 254 to the lane change route instructing device 1 via the communication unit 253 and the communication device 22. Also, when transfer permission has been set, the management unit 255 transmits transfer permission information to the lane change route instructing device 1 together with the target travel route data.

In step S06, the management unit 255, after transmitting the target travel route, waits to receive a travel route command from the lane change route instructing device 1 until a preset waiting time elapses, proceeds to step S07 at a point of receiving the travel route command when receiving a travel route command, and proceeds to step S08 when not receiving a travel route command despite the waiting time elapsing.

In step S08, the management unit 255 notifies the vehicle control command generating unit 256 of the target travel route, as the time for receiving a travel route command from the lane change route instructing device 1 has expired.

In step S07, the management unit 255 determines whether or not the travel route command received from the lane change route instructing device 1 is a change from the transmitted target travel route, proceeds to step S09 when the travel route command is a change from the target travel route, and proceeds to step S10 when the target travel route is maintained. In step S09, as heretofore described, the management unit 255 notifies the vehicle control command generating unit 256 of a travel route set based on the travel route command. Also, when a reason for changing the target travel route is received from the lane change route instructing device 1, the management unit 255, in step S11, informs an occupant of the reason for change via the communication unit 253 and the navigation device 24 using one or both of the speaker 24b and the display 24c. Meanwhile, in step S10, the management unit 255 notifies the vehicle control command generating unit 256 of the target travel route.

In step S12, as heretofore described, the vehicle control command generating unit 256 fixes a target speed, a target steering angle, a direction indicator operation command, and the like, in order to travel in accordance with the travel route command notified of by the management unit 255, and issues commands to the power control device 26, the brake control device 27, the self-steering control device 28, and the light control device 29. Further, each control device carries out a control of the respective device in accordance with a command value.

1-2. Lane Change Route Instructing Device 1 Configuration

Figure 6:
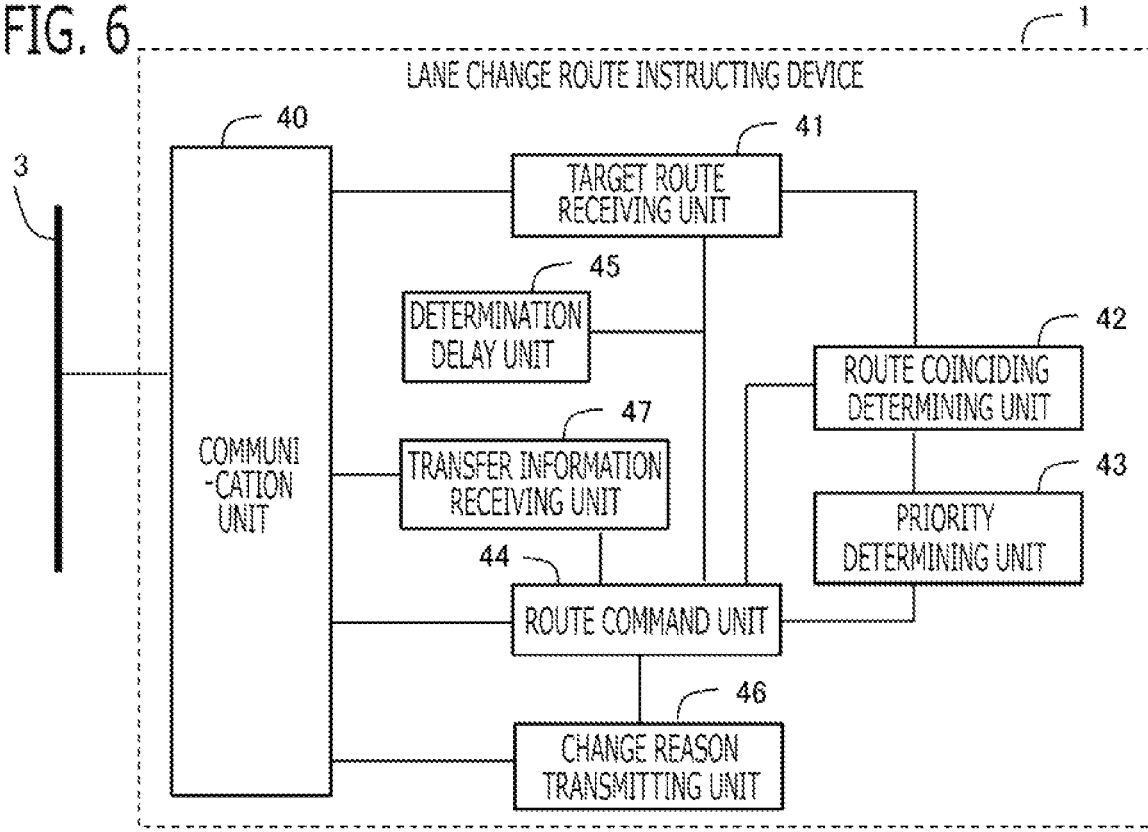
FIG. 6 is a schematic configuration drawing of a lane change route instructing device according to the first embodiment.

FIG. 6 is a schematic configuration drawing of the lane change route instructing device 1. The lane change route instructing device 1 includes a communication unit 40, a target route receiving unit 41, a route coinciding determining unit 42, a priority determining unit 43, a route command unit 44, the determination delay unit 45, a change reason transmitting unit 46, a transfer information receiving unit 47, and the like.

The communication unit 40 communicates with a multiple of vehicles. In the present embodiment, as heretofore described, the communication unit 40 is connected to the network 3, and communicates with a control target vehicle via the network 3 and the base station 4. A control target vehicle is, for example, a vehicle positioned in a region being controlled by the lane change route instructing device 1.

The target route receiving unit 41 receives a target travel route from each vehicle. In the present embodiment, as heretofore described, a target travel route is chronological data such as a vehicle position, a vehicle speed, and a vehicle orientation at each time. Also, as heretofore described, basic information relating to a vehicle, such as a vehicle category, a vehicle outline form, vehicle information, and a degree of urgency of the vehicle, is included in target travel route data. The transfer information receiving unit 47 receives transfer permission information stating that a travel route may be transferred to another vehicle from each vehicle.

The determination delay unit 45 causes a determination by the route coinciding determining unit 42, to be described hereafter, to be delayed until a target travel route is received from each vehicle. According to this configuration, a determination by the route coinciding determining unit 42 can be caused to be carried out in a state wherein a target travel route of each vehicle has been received, whereby a determination accuracy of the route coinciding determining unit 42 can be increased. The determination delay unit 45 may manage the reception of a target travel route of each a multiple of vehicles that are in proximity to each other. When a target travel route of each vehicle has not been received despite a preset waiting time elapsing, the determination delay unit 45 may cause a determination by the route coinciding determining unit 42 to start. A waiting time for each vehicle, as heretofore described, may be set as a waiting time transmitted from the respective vehicle together with the target travel route.

The change reason transmitting unit 46 transmits a reason for changing the target travel route of a low priority coinciding vehicle whose target travel route is to be changed by the route command unit 44, to be described hereafter. As heretofore described, a vehicle that receives a reason for change informs an occupant of the reason for change using the speaker 24b or the display 24c. A reason for change is, for example, "carrying out a lane change in order to give way to an emergency vehicle", "carrying out a lane change in order to give way to a vehicle on the right", "reducing speed in order to give way to a vehicle on the right", or "changing a travel route in consideration of a peripheral traveling situation". According to this configuration, an occupant of a low priority coinciding vehicle can be aware of the host vehicle traveling state, whereby convenience of the occupant can be increased.

Necessity of Inter-Vehicle Travel Route Adjustment Accompanying Lane Change

Adjusting travel routes of front and rear vehicles in the same lane can be achieved by autonomous self-driving of each vehicle that appropriately maintains an inter-vehicle distance. When a vehicle carries out a lane change, however, predicting a lane change of another vehicle is comparatively difficult, and there are cases wherein vehicle travel routes coincide with each other. In particular, the difficulty of predicting increases when two or more vehicles carry out a lane change simultaneously.

Figure 7:
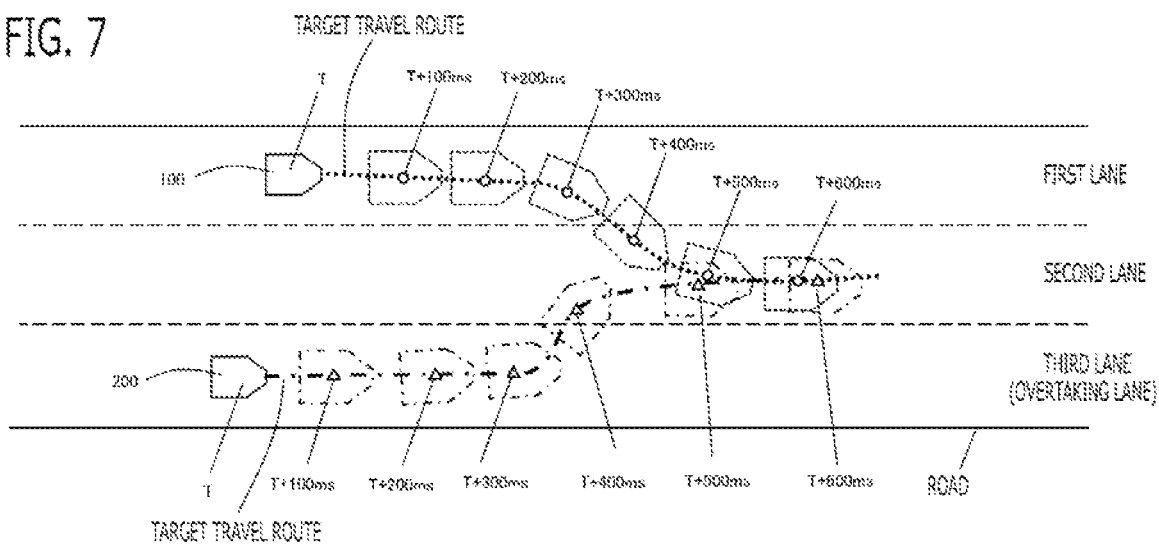
FIG. 7 is a schematic view for describing a travel route determination according to the first embodiment.

A coinciding of travel routes accompanying a lane change will be described using the example of FIG. 7. In FIG. 7, target travel routes received from a first vehicle 100 and a second vehicle 200 are visualized by being superimposed on a road form. The first vehicle 100 is starting a lane change 300 ms after a current time T (T+300 ms), and the second vehicle 200 is starting a lane change 300 ms after the current time T (T+300 ms). Further, a position of the first vehicle 100 and a position of the second vehicle 200 coincide with each other 500 ms after (T+500 ms) and 600 ms after (T+600 ms) the current time T.

In this case too, contact between the vehicles can be avoided by each vehicle carrying out autonomous self-driving, but a sudden traveling operation is necessary. Therefore, it is desirable that a coinciding of travel routes accompanying a lane change is predicted, the coinciding of travel routes is avoided in advance, and a smooth traveling operation is carried out.

Avoiding Traveling Lane Coinciding

Therefore, the route coinciding determining unit 42 determines whether or not vehicle target travel routes will coincide with each other in accompaniment to a lane change. The priority determining unit 43 determines priority relating to an inter-vehicle lane change. The route command unit 44 transmits a travel route command to each vehicle. When it is determined that target travel routes coincide with each other, the route command unit 44 transmits a command to maintain the target travel route to a highest priority coinciding vehicle, which is the vehicle with highest priority among coinciding vehicles whose target travel routes have been determined to coincide with each other. Also, the route command unit 44 transmits a command for evasive travel that avoids coinciding with the target travel route of the highest priority coinciding vehicle to a low priority coinciding vehicle, which is a vehicle other than the highest priority coinciding vehicle among the coinciding vehicles. Meanwhile, when it is determined that target travel routes do not coincide with each other, the route command unit 44 transmits a command to maintain the target travel route to each vehicle.

According to this configuration, a coinciding of travel routes accompanying a lane change can be predicted based on a received multiple of vehicle target travel routes. Further, inter-vehicle priority is determined, the highest priority coinciding vehicle, which has the highest priority, can be caused to maintain the target travel route, and a low priority coinciding vehicle can be caused to carry out evasive travel that avoids coinciding with the target travel route of the highest priority coinciding vehicle. Therefore, a coinciding of travel routes is avoided in advance, and each vehicle can be caused to carry out a smooth traveling operation. Also, as the travel route of a high priority vehicle is prioritized, a vehicle flow in a traffic system can be smoothened, and a vehicle with a high degree of urgency can be caused to travel with priority. Also, as each vehicle is caused to maintain the target travel route when no mutual coinciding occurs, there is no impediment to the autonomous travel of each vehicle, and a vehicle flow in a traffic system can be smoothened. Hereafter, each configuration will be described in detail.

Route Coinciding Determining Unit 42

As heretofore described, the route coinciding determining unit 42 determines whether or not received vehicle target travel routes will coincide with each other in accompaniment to a lane change. Changing a traveling lane on a road having a multiple of traveling lanes, changing a traveling lane in accompaniment to moving from a current traveling road to another road (for example, a merging or a detachment at a point at which roads merge or diverge, or a left or right turn), and the like, are included as lane changes.

In the present embodiment, the route coinciding determining unit 42 determines which vehicle will carry out a lane change based on the target travel route of each vehicle. For example, the route coinciding determining unit 42 compares the target travel route of each vehicle and high accuracy map data, and identifies a vehicle whose lane is changing, or identifies a vehicle that will carry out a lane change from a change in orientation of the vehicle. Further, the route coinciding determining unit 42 determines whether or not the position of a vehicle that will carry out a lane change is closer than a determination distance to the position of each other vehicle at each time. When there are two or more vehicles that will carry out a lane change, the route coinciding determining unit 42 carries out the same determination for each vehicle that will carry out a lane change.

The route coinciding determining unit 42 determines inter-vehicle proximity by also considering the outline form of each vehicle and the orientation of each vehicle. A determination distance in left and right directions from a vehicle is set to be shorter than a determination distance in forward and backward directions from a vehicle in order that two vehicles traveling side by side are not determined to be in proximity. The route coinciding determining unit 42 determines whether or not an inter-vehicle outline is closer than the left and right direction determination distance in the left or right direction from each vehicle, and determines whether or not the inter-vehicle outline is closer than the forward and backward direction determination distance in the forward or backward direction from each vehicle.

For example, in the example of FIG. 7, it is determined that the first vehicle 100 and the second vehicle 200, which will carry out a lane change, will coincide with each other from the time T+500 ms to T+600 ms.

Priority Determining Unit 43

As heretofore described, the priority determining unit 43 determines inter-vehicle priority relating to a lane change. Inter-vehicle priority can also be expressed as an inter-vehicle order of priority. The priority determining unit 43 may determine priority between vehicles that have been determined to be going to coincide with each other, or may determine priority between vehicles that have been determined to be going to coincide with each other and a vehicle in a periphery of the coinciding vehicles. In the latter case, a case wherein the travel route of a vehicle in a periphery of the coinciding vehicles is affected by a change in the travel route of a coinciding vehicle can also be accommodated.

In the present embodiment, the priority determining unit 43 determines inter-vehicle priority by combining a multiple of rules. For example, evaluation points are set for each rule, and higher evaluation points are set for a rule with higher priority. The priority determining unit 43 determines whether or not each rule is satisfied for each vehicle, totals up the evaluation points of the satisfied rules, and adopts the total value as the evaluation points of the respective vehicle. Further, the priority determining unit 43 determines that a vehicle with higher evaluation points is a vehicle with higher priority. When there are a multiple of vehicles with the same evaluation points, the priority determining unit 43 prioritizes a vehicle selected at random.

For example, the following kinds of rule are included in the multiple of rules. The following rules are examples, and other arbitrary rules and evaluation points can be used. Also, information necessary for determining whether each rule is satisfied can also be acquired from each vehicle, high accuracy map data, and the like.

Rule 1: whether a vehicle is a vehicle such that a cause of impediment to the travel of the vehicle, such as an obstacle, a pedestrian, a decrease in lanes, or a roadwork site, lies ahead in the current traveling lane. Evaluation points 10.

Rule 2: whether a vehicle is an emergency vehicle such as an ambulance or a police car. Evaluation points 8.

Rule 3: whether a vehicle is a vehicle that is due to move from the current traveling road to another road. Evaluation points 7.

Rule 4: whether a vehicle is a vehicle behind which an emergency vehicle is traveling in the current traveling lane. Evaluation points 5.

Rule 5: whether a vehicle is a public transport vehicle such as a fixed-route bus. Evaluation points 4.

Rule 6: whether a vehicle is a vehicle positioned farther forward than another vehicle that is a subject of priority determination. Evaluation points 4.

Rule 7: whether a vehicle is a vehicle whose traveling speed is higher than another vehicle that is a subject of priority determination. An ACC (adaptive cruise control) set speed may be used as the traveling speed. Evaluation points 4.

Rule 8: whether a vehicle is a vehicle with a long body, or in a long vehicle group. Evaluation points 4.

Rule 9: whether a vehicle is a vehicle that is traveling in an overtaking lane or in a high speed lane. Evaluation points 4.

Rule 10: whether a vehicle is a vehicle that is nearer to a section in which a lane change is prohibited than another vehicle that is a subject of priority determination. Evaluation points 4.

Rule 11: whether a vehicle is a vehicle with a larger number of occupants than another vehicle that is a subject of priority determination. Evaluation points 4.

Rule 12: whether a vehicle is a vehicle that has recently ceded a lane. Evaluation points 4.

In this way, the priority determining unit 43 at least determines inter-vehicle priority by combining a multiple of rules relating to the necessity of a lane change. In the heretofore described example, rule 1, rule 3, rule 4, rule 10, and the like, correspond to rules relating to the necessity of a lane change.

The priority determining unit 43 sets the priority of a vehicle from which transfer permission information has been received to be lower than the priority of a vehicle from which transfer permission information has not been received. For example, when there are a multiple of vehicles with the same evaluation points, the priority determining unit 43 sets the priority of a vehicle from which transfer permission information has been received to be lower. Also, the priority determining unit 43 may reduce the evaluation points of a vehicle from which transfer permission information has been received.

For example, in the example of FIG. 7, the first vehicle 100 is positioned farther forward than the second vehicle 200, because of which rule 6 is satisfied, and 4 points are added to the evaluation points of the first vehicle 100. Meanwhile, the second vehicle 200 is traveling in the overtaking lane, because of which rule 9 is satisfied, and 4 points are added to the evaluation points of the second vehicle 200. Also, the traveling speed of the second vehicle 200 is higher than the traveling speed of the first vehicle 100, because of which rule 7 is satisfied, and 4 points are added to the evaluation points of the second vehicle 200. Therefore, the first vehicle 100 has a total of 4 evaluation points, and the second vehicle 200 has a total of 8 evaluation points, because of which the priority of the second vehicle 200 is higher than the priority of the first vehicle 100.

Route Command Unit 44

As heretofore described, when it is determined that target travel routes coincide with each other, the route command unit 44 transmits a command to maintain the target travel route to the highest priority coinciding vehicle, which is the vehicle with highest priority among coinciding vehicles whose target travel routes have been determined to coincide with each other. Also, the route command unit 44 transmits a command for evasive travel that avoids coinciding with the target travel route of the highest priority coinciding vehicle to a low priority coinciding vehicle, which is a vehicle other than the highest priority coinciding vehicle among the coinciding vehicles. Hereafter, a multiple of examples of an evasive travel command will be described.

First Case of Evasive Travel Command

In the present embodiment, the route command unit 44 transmits a lane maintaining command to maintain the current traveling lane as an evasive travel command to a low priority coinciding vehicle when there is a coinciding of target travel routes in accompaniment to a lane change by the low priority coinciding vehicle.

According to this configuration, the traveling of the highest priority coinciding vehicle can be prioritized by issuing an instruction to a low priority coinciding vehicle for a simple travel route that causes a lane change plan to be canceled, and causes the current traveling lane to be maintained.

Figure 8:
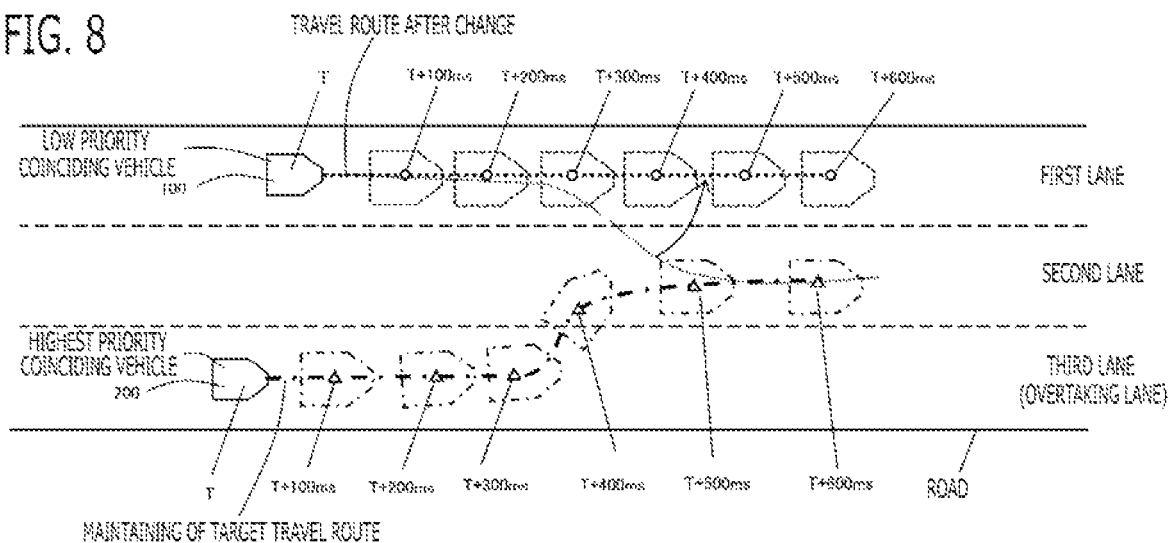
FIG. 8 is a schematic view for describing a travel route determination according to the first embodiment.

For example, in the example of FIG. 7, as heretofore described, the priority of the second vehicle 200 is higher than the priority of the first vehicle 100, because of which the second vehicle 200 is determined to be the highest priority coinciding vehicle, and the first vehicle 100 is determined to be a low priority coinciding vehicle. Further, the route command unit 44 transmits a lane maintaining command to maintain the current traveling lane to the first vehicle 100, and transmits a command to maintain the target travel route to the second vehicle 200. As a result of this, as shown in FIG. 8, the first vehicle 100 (the management unit 255) sets a travel route that maintains the current traveling lane, and maintains travel in the current traveling lane. Therefore, a lane change by the high priority second vehicle 200 is prioritized, a coinciding of travel routes is avoided in advance, and each vehicle can be caused to carry out a smooth traveling operation.

Second Case of Evasive Travel Command

When it is determined that a coinciding of target travel routes will occur, the route command unit 44 fixes a low priority coinciding vehicle evasive travel route that avoids the target travel route of the highest priority coinciding vehicle, and transmits an evasive travel route command to the low priority coinciding vehicle.

According to this configuration, a low priority coinciding vehicle can be caused to travel along an evasive travel route that avoids the target travel route of the highest priority coinciding vehicle.

When fixing a low priority coinciding vehicle evasive travel route, the route command unit 44 takes the traveling situation in the periphery of the low priority coinciding vehicle into consideration. According to this configuration, an appropriate, safe evasive travel route that takes a peripheral traveling situation into consideration can be fixed.

Herein, a traveling state of a vehicle peripheral to the low priority coinciding vehicle, a state of a traveling road in the periphery of the low priority coinciding vehicle, and the like, are included in the peripheral traveling situation. When a peripheral vehicle is a vehicle whose target travel route has been received, the target travel route of the vehicle is used as the traveling state of the peripheral vehicle. When a peripheral vehicle is a vehicle whose target travel route has not been received, a current traveling state of the vehicle (for example, the speed and the vehicle orientation) obtained from a road monitoring system or another vehicle is used as the traveling state of the peripheral vehicle. Also, a road form, a lane, sign information, and the like, obtained from high accuracy map data is used as the state of the peripheral traveling road. Also, an obstacle, a pedestrian, signal information, traffic jam information, and the like, obtained from a road monitoring system or another vehicle is used as the state of the peripheral traveling road. A road monitoring system is a system that monitors a road state, a traffic light state, a traveling vehicle state, and the like, based on various kinds of information.

Figure 9:
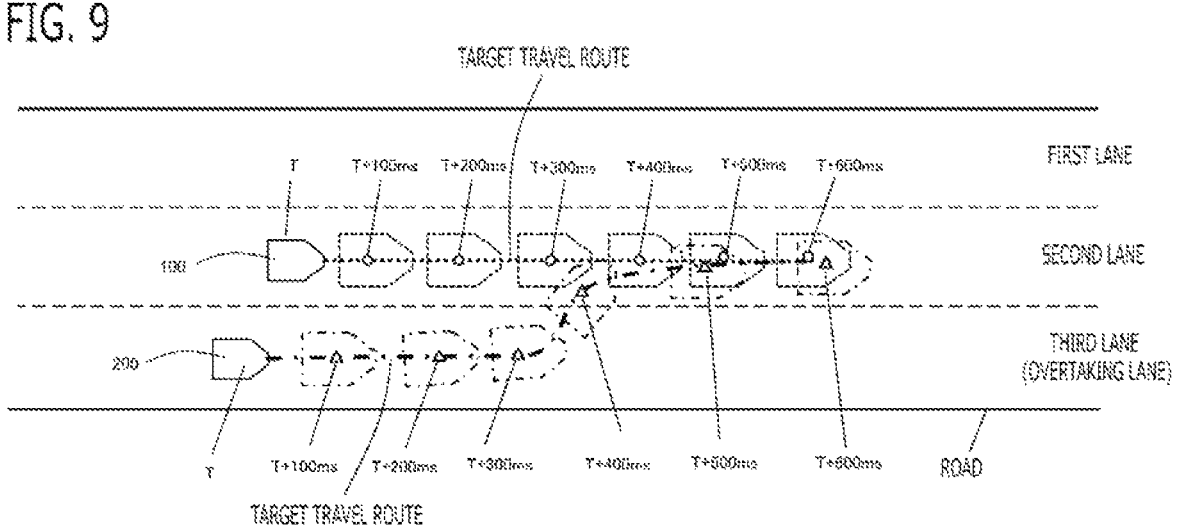
FIG. 9 is a schematic view for describing a travel route determination according to the first embodiment.
Figure 10:
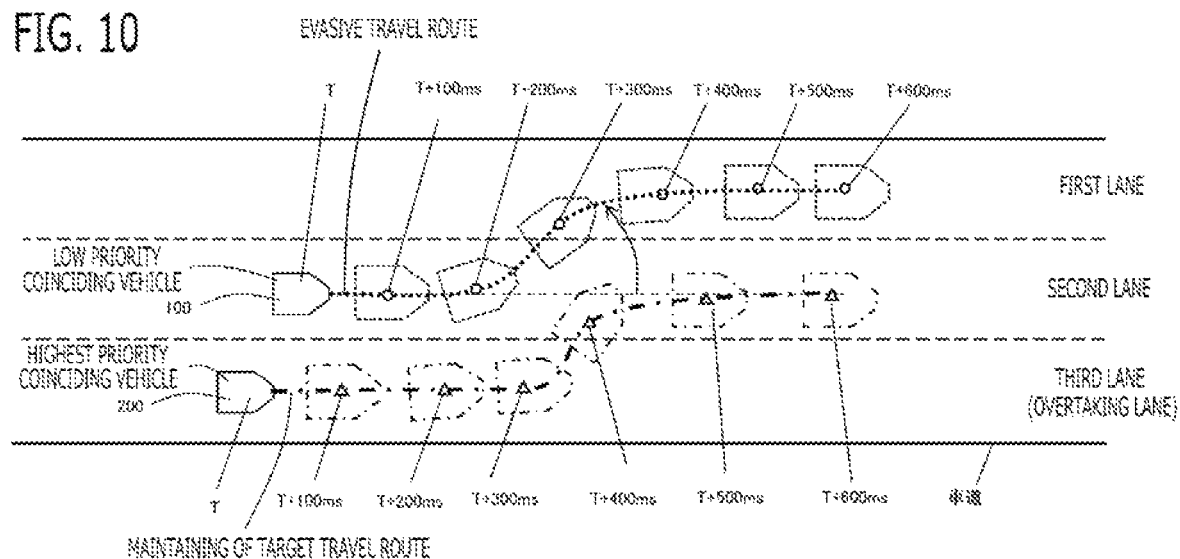
FIG. 10 is a schematic view for describing a travel route determination according to the first embodiment.

For example, a second case will be described using FIG. 9 and FIG. 10. FIG. 9 shows the received target travel routes of the first vehicle 100 and the second vehicle 200, and FIG. 10 shows travel routes after a determination by the route command unit 44. In FIG. 9, the target travel route of the second vehicle 200 is starting a lane change 300 ms after the current time T (T+300 ms), and the target travel route of the first vehicle 100 is maintaining the current traveling lane. Further, the position of the first vehicle 100 and the position of the second vehicle 200 coincide with each other from 400 ms after (T+400 ms) to 600 ms after (T+600 ms) the current time T in accompaniment to the lane change by the second vehicle 200.

In the example of FIG. 9, in the same way as in the case of FIG. 7, the first vehicle 100 has a total of 4 evaluation points, and the second vehicle 200 has a total of 8 evaluation points, because of which the priority of the second vehicle 200 is higher than the priority of the first vehicle 100. Therefore, the second vehicle 200 is determined to be the highest priority coinciding vehicle, and the first vehicle 100 is determined to be a low priority coinciding vehicle.

As shown in the example of FIG. 10, the route command unit 44 fixes an evasive travel route such that the first vehicle 100, which is a low priority coinciding vehicle, carries out a change of lane to the left-hand lane in order to avoid the target travel route of the second vehicle 200, which is the highest priority coinciding vehicle. At this time, the route command unit 44 gives consideration to the matter that a lane exists on the left side of the current traveling lane of the first vehicle 100, and the matter that no other vehicle, obstacle, or the like exists in that left-hand lane, as the peripheral traveling situation. As a result of this, the low priority first vehicle 100 is changed to the left-hand lane, avoiding the lane change of the high priority second vehicle 200, and the high priority second vehicle 200 can be caused to change lane as per the target travel route.

Third Case of Evasive Travel Command

When a coinciding of target travel routes occurs in accompaniment to a lane change by a low priority coinciding vehicle, the route command unit 44 fixes an evasive travel route for the low priority coinciding vehicle, whereby the low priority coinciding vehicle carries out a lane change while avoiding the target travel route of the highest priority coinciding vehicle, and transmits an evasive travel route command to the low priority coinciding vehicle.

According to this configuration, a low priority coinciding vehicle can be caused to carry out a lane change as planned, while avoiding the target travel route of the highest priority coinciding vehicle.

When fixing a low priority coinciding vehicle evasive travel route, the route command unit 44 takes the traveling situation in the periphery of the low priority coinciding vehicle into consideration, in the same way as in the second case of an evasive travel command.

Figure 11:
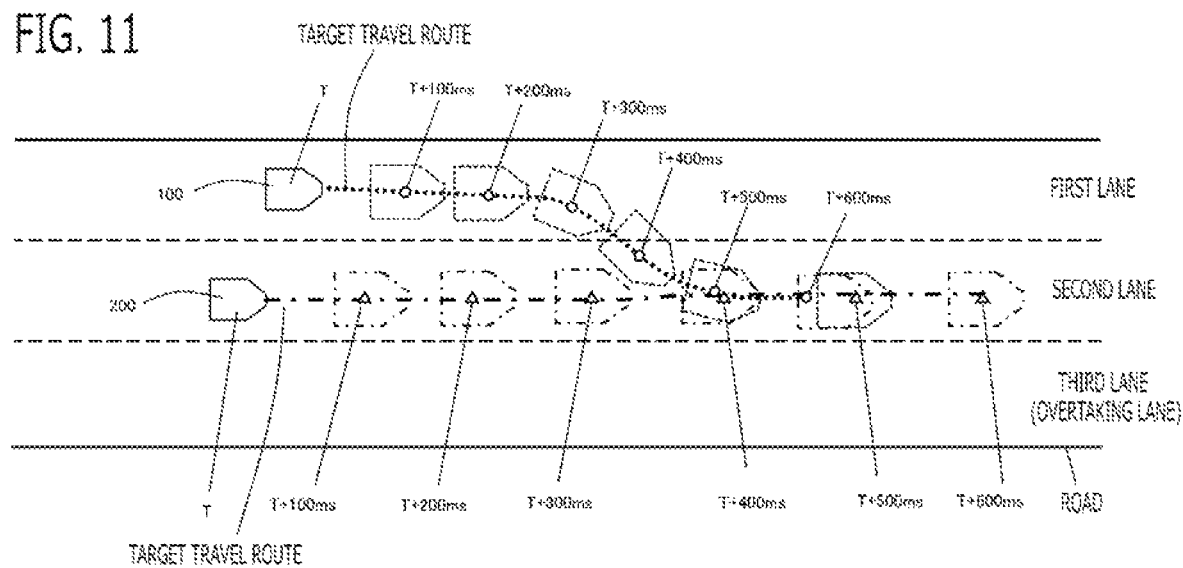
FIG. 11 is a schematic view for describing a travel route determination according to the first embodiment.
Figure 12:
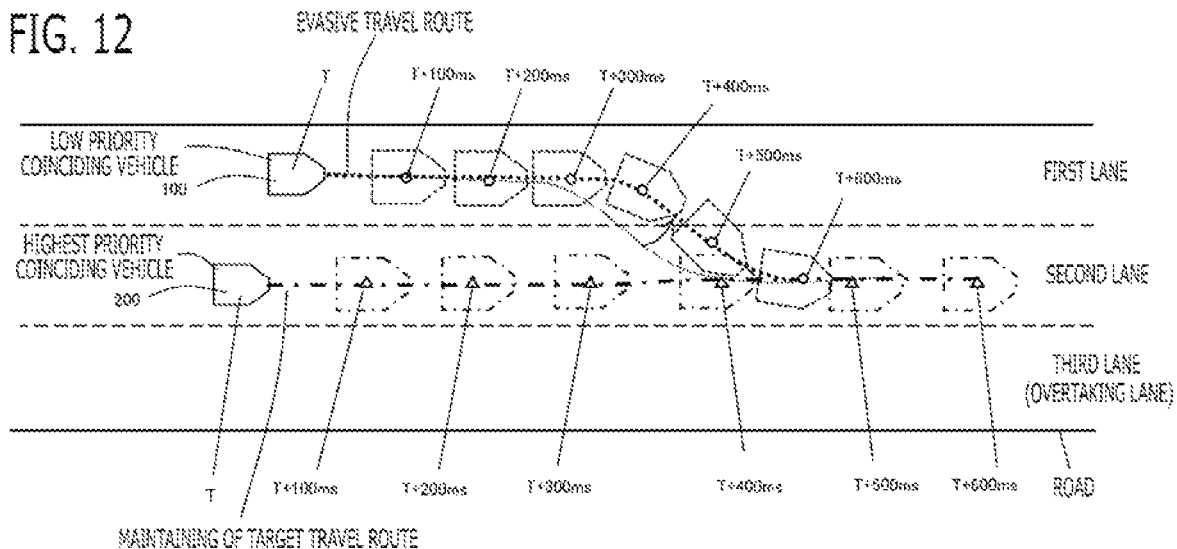
FIG. 12 is a schematic view for describing a travel route determination according to the first embodiment.
Figure 13:
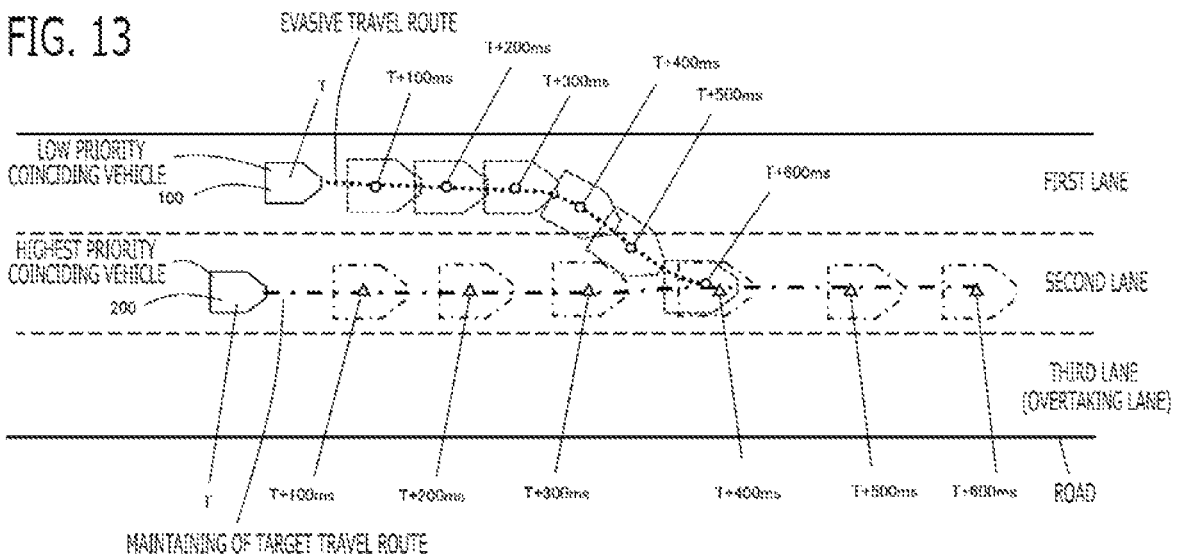
FIG. 13 is a schematic view for describing a travel route determination according to the first embodiment.

For example, a third case will be described using FIG. 11, FIG. 12, and FIG. 13. FIG. 11 shows the received target travel routes of the first vehicle 100 and the second vehicle 200, and FIG. 12 and FIG. 13 show two examples of travel routes after a determination by the route command unit 44. In FIG. 11, the target travel route of the first vehicle 100 is starting a lane change to the right-hand lane 300 ms after the current time T (T+300 ms), and the target travel route of the second vehicle 200 is maintaining the current traveling lane. Further, the position of the first vehicle 100 and the position of the second vehicle 200 coincide with each other in the vicinity of 400 ms after the current time T (T+400 ms) in accompaniment to the lane change by the first vehicle 100.

In the example of FIG. 11, in the same way as in the case of FIG. 7, the first vehicle 100 has a total of 4 evaluation points, and the second vehicle 200 has a total of 8 evaluation points, because of which the priority of the second vehicle 200 is higher than the priority of the first vehicle 100. Therefore, the second vehicle 200 is determined to be the highest priority coinciding vehicle, and the first vehicle 100 is determined to be a low priority coinciding vehicle.

As shown in the example of FIG. 12, the route command unit 44 fixes an evasive travel route that, by delaying the timing of a lane change, causes a low priority coinciding vehicle to change lane after the highest priority coinciding vehicle has passed in order to cause the low priority coinciding vehicle to change lane while avoiding the target travel route of the highest priority coinciding vehicle. As a result of this, the low priority first vehicle 100 is changed to the right-hand lane, avoiding the travel route of the high priority second vehicle 200, and the high priority second vehicle 200 can be caused to travel as per the target travel route.

Alternatively, as shown in the example of FIG. 13, the route command unit 44 fixes an evasive travel route that brings forward the timing at which the highest priority coinciding vehicle passes by causing a low priority coinciding vehicle to reduce speed, thereby causing the low priority coinciding vehicle to change lane after the highest priority coinciding vehicle has passed, in order to cause the low priority coinciding vehicle to change lane while avoiding the target travel route of the highest priority coinciding vehicle. In this way, the route command unit 44 can fix an evasive travel route that accompanies a vehicle deceleration (or acceleration).

Fourth Case of Evasive Travel Command

When there are a multiple of low priority coinciding vehicles, the route command unit 44 fixes evasive travel routes from a low priority coinciding vehicle with a higher priority in order that the travel route of a low priority coinciding vehicle with a lower priority avoids the travel route of a low priority coinciding vehicle with a higher priority, while avoiding the target travel route of the highest priority coinciding vehicle, and transmits an evasive travel route command to each low priority coinciding vehicle.

This configuration is such that even when there are a multiple of low priority coinciding vehicles, the travel route of a vehicle with a higher priority is prioritized, because of which a vehicle flow in a traffic system can be further smoothened, and a vehicle with a higher degree of urgency can be caused to travel with priority.

When fixing evasive travel routes of a multiple of low priority coinciding vehicles, the route command unit 44 takes the traveling situation in the periphery of each low priority coinciding vehicle into consideration, in the same way as in the second case of an evasive travel command.

Figure 14:
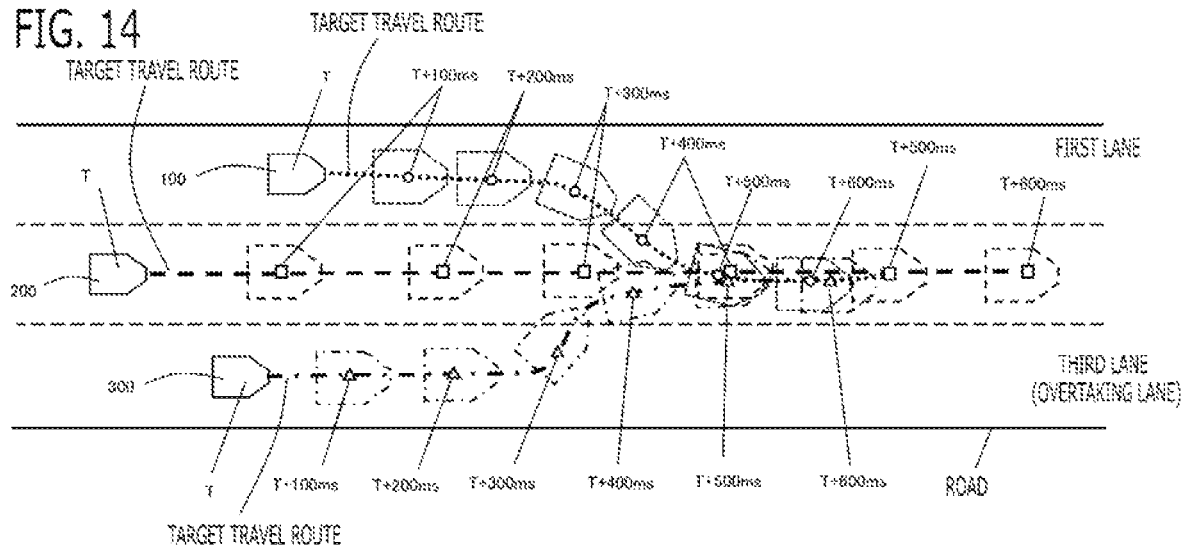
FIG. 14 is a schematic view for describing a travel route determination according to the first embodiment.
Figure 15:
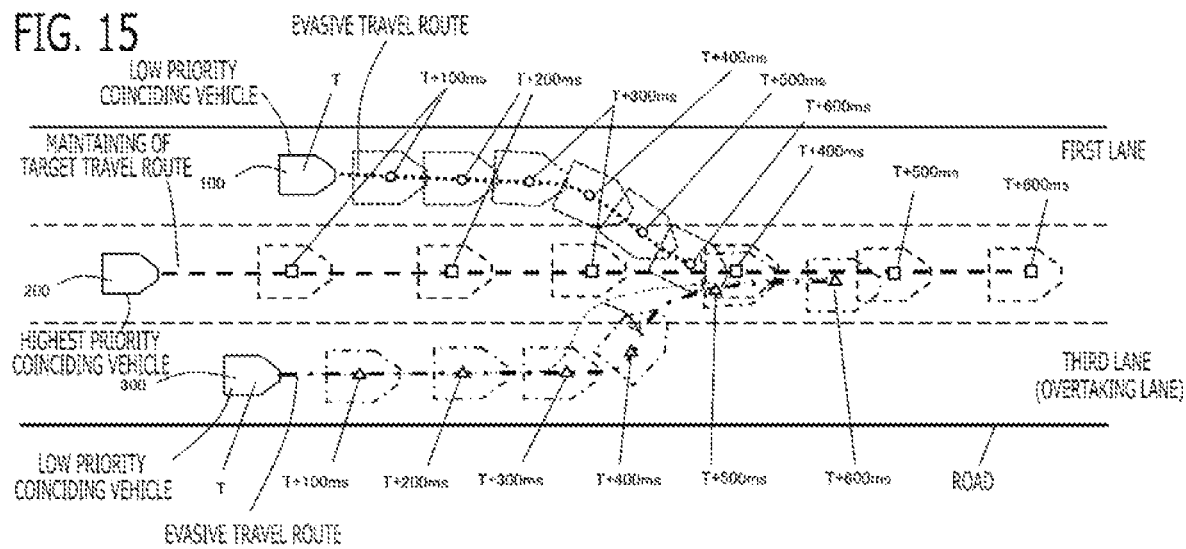
FIG. 15 is a schematic view for describing a travel route determination according to the first embodiment.

For example, a fourth case will be described using FIG. 14 and FIG. 15. FIG. 14 shows the received target travel routes of the first vehicle 100, the second vehicle 200, and a third vehicle 300, and FIG. 15 shows two examples of travel routes after a determination by the route command unit 44. In FIG. 14, the target travel route of the first vehicle 100 is starting a lane change to the right-hand lane 300 ms after the current time T (T+300 ms), the target travel route of the second vehicle 200 is maintaining the current traveling lane, and the target travel route of the third vehicle 300 is starting a lane change to the left-hand lane 300 ms after the current time T (T+300 ms). Further, the positions of the first vehicle 100, the second vehicle 200, and the third vehicle 300 coincide with each other 400 ms after the current time T (T+400 ms) in accompaniment to the lane changes by the first vehicle 100 and the third vehicle 300.

In the example of FIG. 14, the second vehicle 200 is an emergency vehicle, meaning that rule 2 is satisfied, and the evaluation points are higher than those of other coinciding vehicles, because of which the second vehicle 200 is determined to be the highest priority coinciding vehicle, and the first vehicle 100 and the third vehicle 300 are determined to be low priority coinciding vehicles. Further, the first vehicle 100 is positioned farther forward than the third vehicle 300, meaning that rule 6 is satisfied, and 4 points are added to the evaluation points of the first vehicle 100. Also, the traveling speed of the third vehicle 300 is higher than the traveling speed of the first vehicle 100, meaning that rule 7 is satisfied, and 4 points are added to the evaluation points of the first vehicle 100. Meanwhile, the third vehicle 300 is traveling in the overtaking lane, meaning that rule 9 is satisfied, and 4 points are added to the evaluation points of the third vehicle 300. Therefore, the third vehicle 300 has a total of 8 evaluation points, and the first vehicle 100 has a total of 4 evaluation points, because of which the priority of the third vehicle 300 is higher than the priority of the first vehicle 100.

As shown in the example of FIG. 15, the route command unit 44 transmits a command to maintain the target travel route to the second vehicle 200, which is the highest priority coinciding vehicle. Further, the route command unit 44 fixes an evasive travel route that, by delaying the timing of a lane change, causes the third vehicle 300 to carry out a lane change after the highest priority coinciding vehicle has passed in order to cause the third vehicle 300, whose priority is higher than that of the first vehicle 100 among the low priority coinciding vehicles, to change lane while avoiding the target travel route of the second vehicle 200. Further, the route command unit 44 fixes an evasive travel route that, by causing the first vehicle 100 to reduce speed, causes the first vehicle 100 to carry out a lane change after the second vehicle 200 and the third vehicle 300 have passed, in order to cause the first vehicle 100, whose priority is lower than that of the third vehicle 300, to carry out a lane change while avoiding the second vehicle 200 and the third vehicle 300. As a result of this, evasive travel routes such that the travel route of the first vehicle 100, which has a lower priority, avoids the travel route of the third vehicle 300, which has a higher priority, while avoiding the target travel route of the second vehicle 200, which has the highest priority, are fixed for the multiple of low priority coinciding vehicles, travel routes are fixed in order of vehicles with higher priority, and each vehicle can be caused to carry out smooth traveling.

Lane Change Route Instructing Device 1 Hardware Configuration Example

Figure 32:
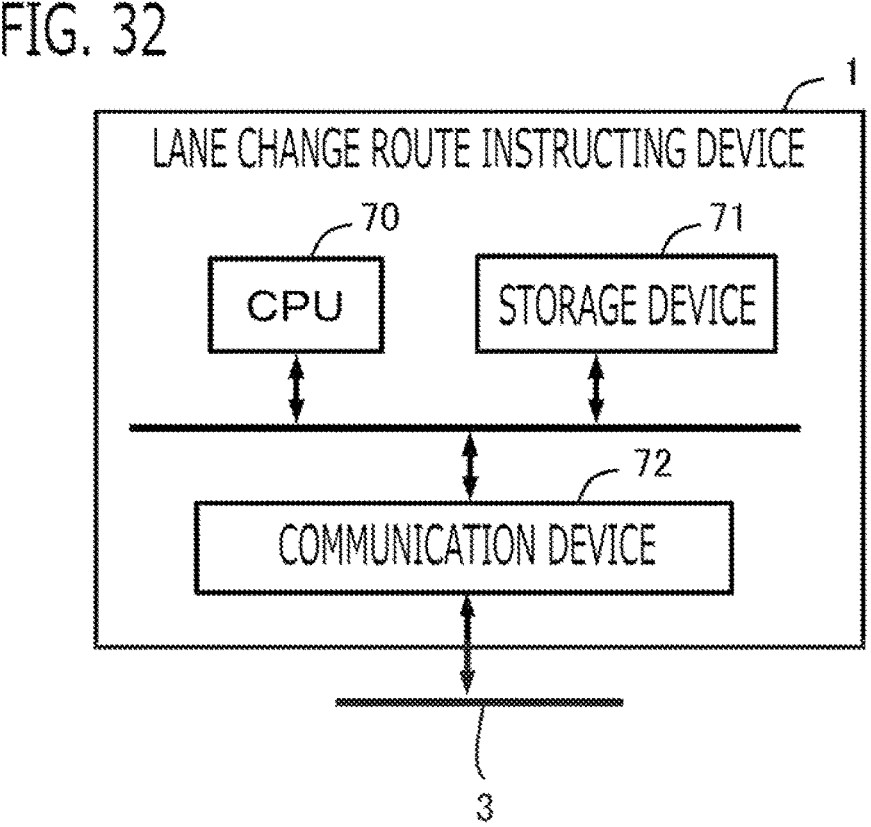
FIG. 32 is a hardware configuration drawing of the lane change route instructing device according to the first embodiment.

Each function of the lane change route instructing device 1 is realized by a processing circuit included in the lane change route instructing device 1. As shown in FIG. 32, the lane change route instructing device 1 includes an arithmetic processing device 70 (a computer) such as a CPU (central processing unit), a storage device 71 such as a RAM (random access memory), a ROM (read-only memory), or a hard disk (HDD), a communication device 72 that carries out data communication, and the like. The communication device 72 is connected to the network 3, and carries out wired data communication.

A program for each function, high accuracy map data, and the like are stored in the storage device 71, such as a hard disk, of the lane change route instructing device 1. Each process of the lane change route instructing device 1 is realized by the arithmetic processing device 70 executing a program (software) stored in the storage device 71, and operating in conjunction with other hardware such as the storage device 71 and the communication device 72.

Lane Change Route Instructing Device 1 Flowchart

Figure 16:
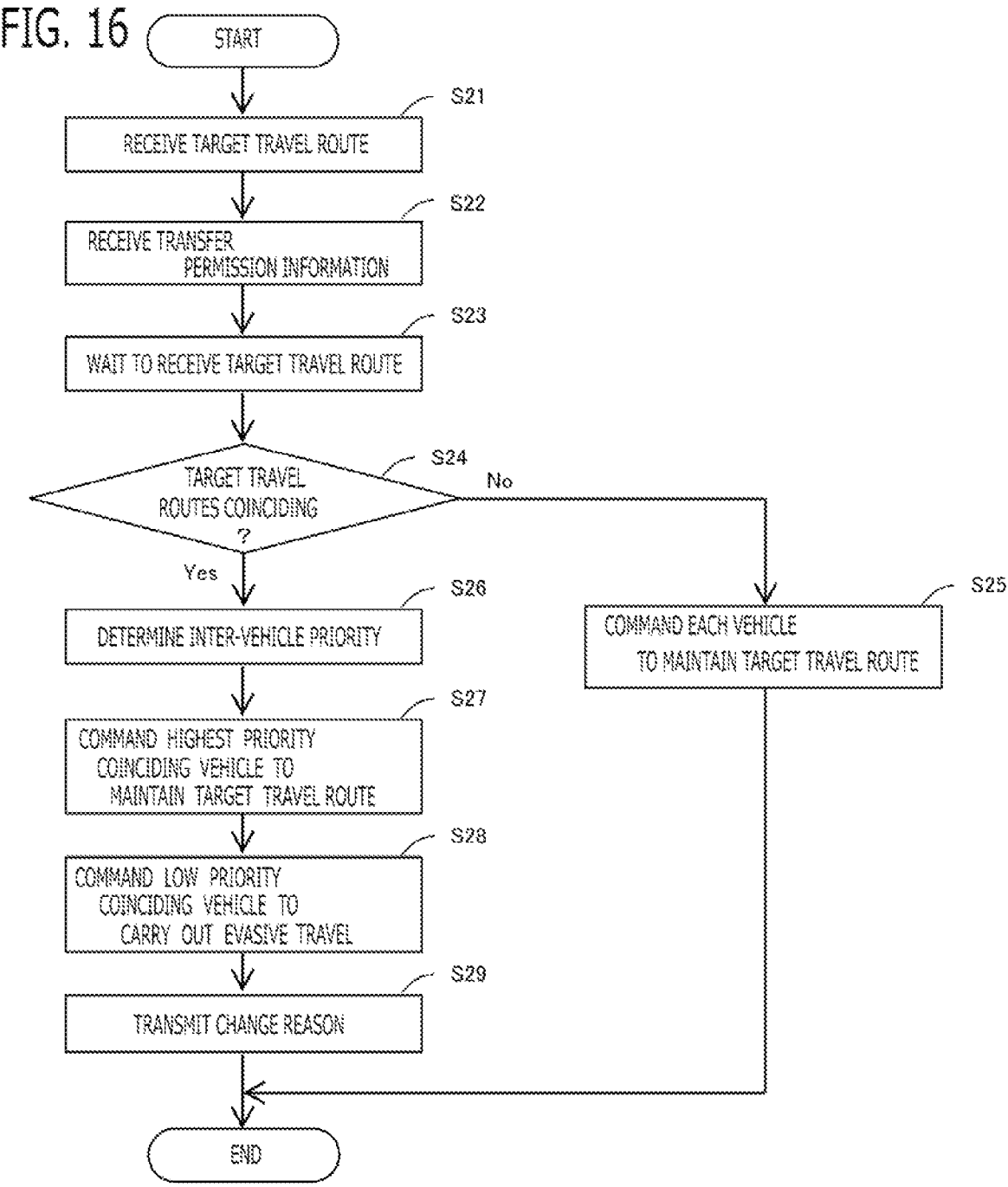
FIG. 16 is a flowchart illustrating a process of the lane change route instructing device according to the first embodiment.

Next, a process of the lane change route instructing device 1 will be described, using a flowchart of FIG. 16. A process of the flowchart of FIG. 16 is, for example, executed repeatedly every constant computing cycle.

In step S21, as heretofore described, the target route receiving unit 41 receives a target travel route from each vehicle via the communication unit 40. Also, in step S22, the transfer information receiving unit 47 receives transfer permission information from each vehicle. In step S23, as heretofore described, the determination delay unit 45 causes a determination by the route coinciding determining unit 42 to be delayed until a target travel route is received from each vehicle.

In step S24, as heretofore described, the route coinciding determining unit 42 determines whether or not the received target travel routes of each vehicle will coincide with each other in accompaniment to a lane change, proceeds to step S26 when determining that there will be a coinciding, and proceeds to step S25 when determining that there will be no coinciding. In step S25, the route command unit 44 transmits a command to maintain the target travel route to each vehicle via the communication unit 40.

Meanwhile, in step S26, as heretofore described, the priority determining unit 43 determines inter-vehicle priority. Further, in step S27, as heretofore described, the route command unit 44 transmits a command to maintain the target travel route via the communication unit 40 to the highest priority coinciding vehicle among coinciding vehicles whose target travel routes have been determined to be going to coincide with each other.

In step S28, as heretofore described, the route command unit 44 transmits a command via the communication unit 40 to a low priority coinciding vehicle for evasive travel that avoids coinciding with the target travel route of the highest priority coinciding vehicle. For example, the route command unit 44 carries out the kinds of process of the heretofore described first case to fourth case. When fixing a low priority coinciding vehicle evasive travel route, the route command unit 44 takes the traveling situation in the periphery of the low priority coinciding vehicle into consideration. Also, the route command unit 44 fixes an evasive travel route that accompanies a vehicle deceleration or acceleration.

In step S29, the change reason transmitting unit 46 transmits a reason for the target travel route being changed, via the communication unit 40, to a low priority coinciding vehicle whose target travel route is to be changed.

2. Second Embodiment

Next, a lane change route instructing system according to a second embodiment will be described. A description of a configuration portion the same as in the first embodiment will be omitted. A basic configuration and process of the lane change route instructing system according to the present embodiment are the same as in the first embodiment. In the present embodiment, a point that processes of the route coinciding determining unit 42, the priority determining unit 43, the route command unit 44, and the like, are carried out after carrying out a change of the received target travel route of each vehicle with consideration to the peripheral traveling situation differs from the first embodiment.

Figure 17:
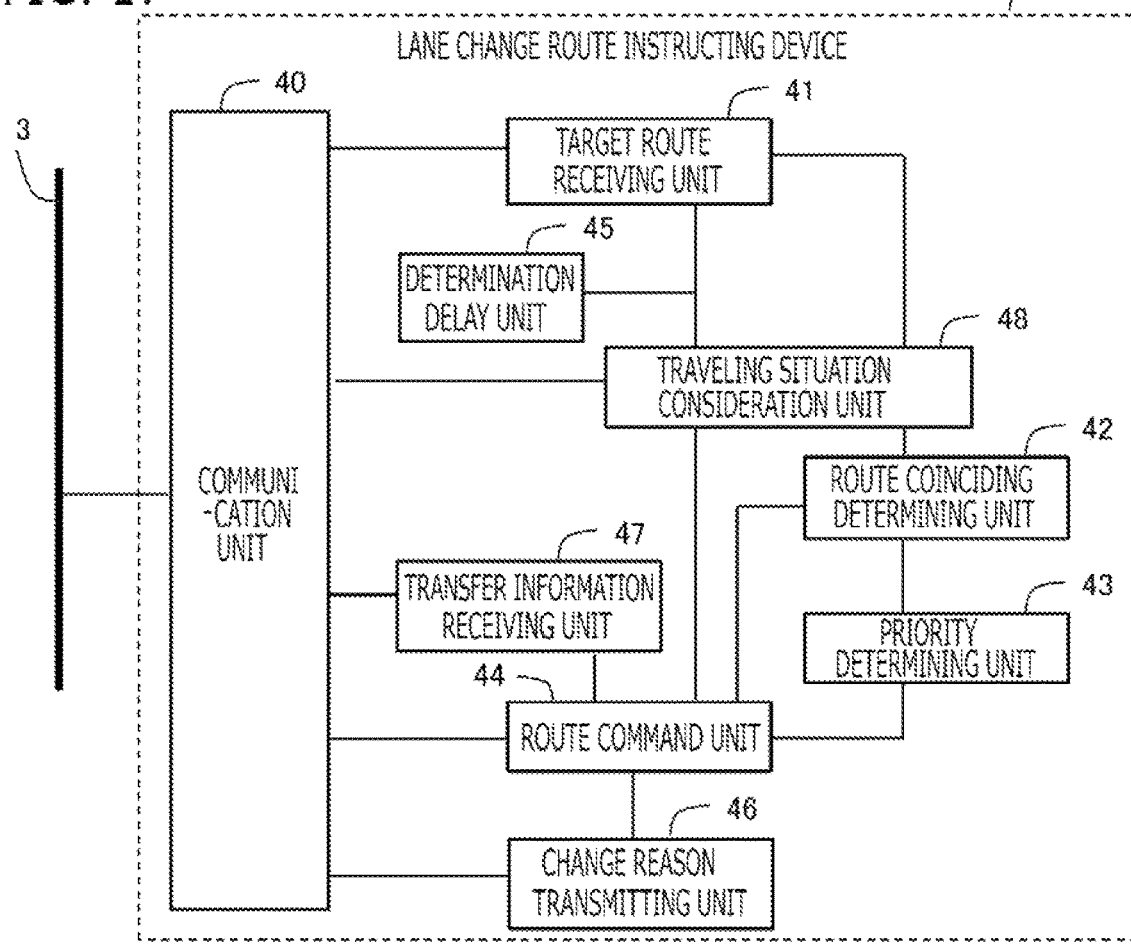
FIG. 17 is a schematic configuration drawing of a lane change route instructing device according to a second embodiment.

FIG. 17 shows a schematic configuration drawing of the lane change route instructing device 1 according to the present embodiment. In addition to the communication unit 40 to the transfer information receiving unit 47, the lane change route instructing device 1 further includes a traveling situation consideration unit 48.

When a peripheral traveling situation such as an unconsidered obstacle or road situation exists in the target travel route of a vehicle, there is a possibility that, even when a travel route is determined based on the target travel route transmitted from each vehicle, a determination result is not in accordance with the peripheral traveling situation, and is inappropriate.

Therefore, the traveling situation consideration unit 48 changes the received target travel route of each vehicle with consideration to the peripheral traveling situation. The route coinciding determining unit 42 and the priority determining unit 43 carry out a determination using the target travel route after a changing process carried out by the traveling situation consideration unit 48. When the target travel route after the changing process is to be maintained, the route command unit 44 conveys a command for the target travel route after the changing process to the corresponding vehicle. In the case of a vehicle whose target travel route has not been changed by the traveling situation consideration unit 48, the received target travel route is used in the process of each unit.

According to this configuration, the target travel route of each vehicle is changed by a peripheral traveling situation ascertained by the lane change route instructing device 1 being taken into consideration. Further, a travel route determination is carried out using the target travel route after the changing process, and the determination result is a more appropriate result that is in accordance with the peripheral traveling situation.

Herein, as described in the first embodiment, a traveling state of a vehicle peripheral to each vehicle whose target travel route has been received, a state of a traveling road in the periphery, and the like, are included in the peripheral traveling situation. A vehicle traveling state (for example, the speed and the vehicle orientation) obtained from a road monitoring system or another vehicle is used as the traveling state of the peripheral vehicle. Also, a road form, a lane, sign information, and the like, obtained from high accuracy map data is used as the state of the peripheral traveling road. Also, an obstacle, a pedestrian, signal information, traffic jam information, and the like, obtained from a road monitoring system or each vehicle is used as the state of the peripheral traveling road.

For example, when there is an impediment to travel such as an obstacle, a lane decrease, roadworks information, or another vehicle in the target travel route as the peripheral traveling situation, the traveling situation consideration unit 48 changes the target travel route in such a way as to avoid the impediment. When there is traffic information such as traffic jam information, sign information, or traffic light information in the target travel route as the peripheral traveling situation, the traveling situation consideration unit 48 changes the target travel route in such a way as to carry out a deceleration, a stopping, an acceleration, or the like, of the vehicle.

Figure 18:
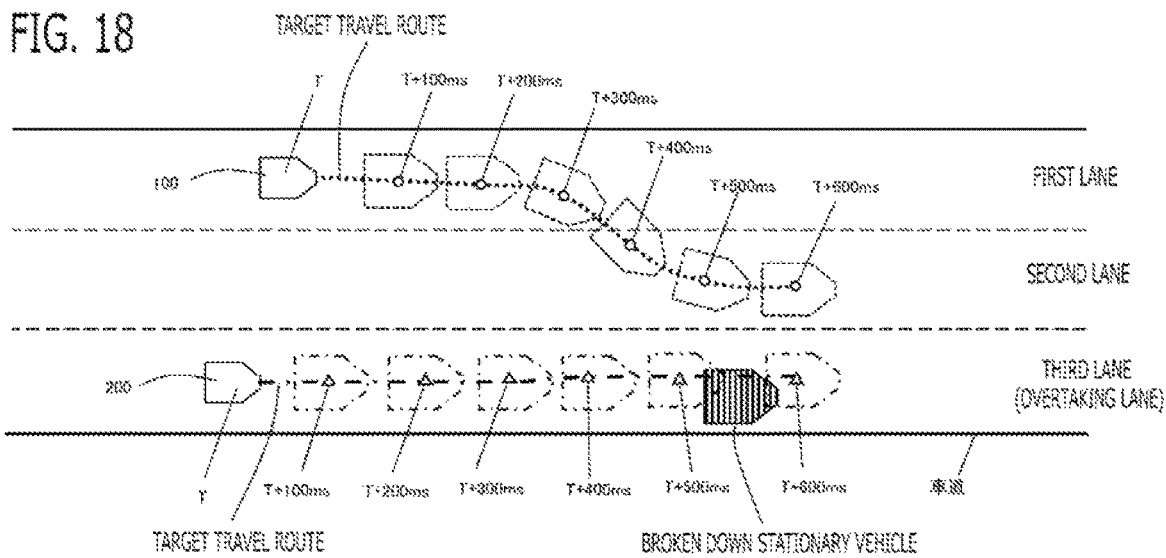
FIG. 18 is a schematic view for describing a travel route determination according to the second embodiment.

An example will be described using FIG. 18, FIG. 19, and FIG. 20. FIG. 18 shows received target travel routes of the first vehicle 100 and the second vehicle 200, FIG. 19 shows the target travel route of each vehicle after a changing process that takes the peripheral traveling situation into consideration, and FIG. 20 shows travel routes after a determination using the target travel route of each vehicle after the changing process.

In FIG. 18, the target travel route of the second vehicle 200 is a route that maintains the traveling lane. However, there is a broken down stationary vehicle that the second vehicle 200 has not yet recognized farther ahead in the traveling lane of the second vehicle 200. Meanwhile, the lane change route instructing device 1 has recognized the broken down stationary vehicle from information obtained by a road monitoring system from a preceding vehicle. The target travel route of the first vehicle 100 is starting a lane change to the right-hand lane 300 ms after the current time T (T+300 ms). The lane change route instructing device 1 has not recognized any peripheral traveling situation to pay particular attention to in the target travel route of the first vehicle 100.

Figure 19:
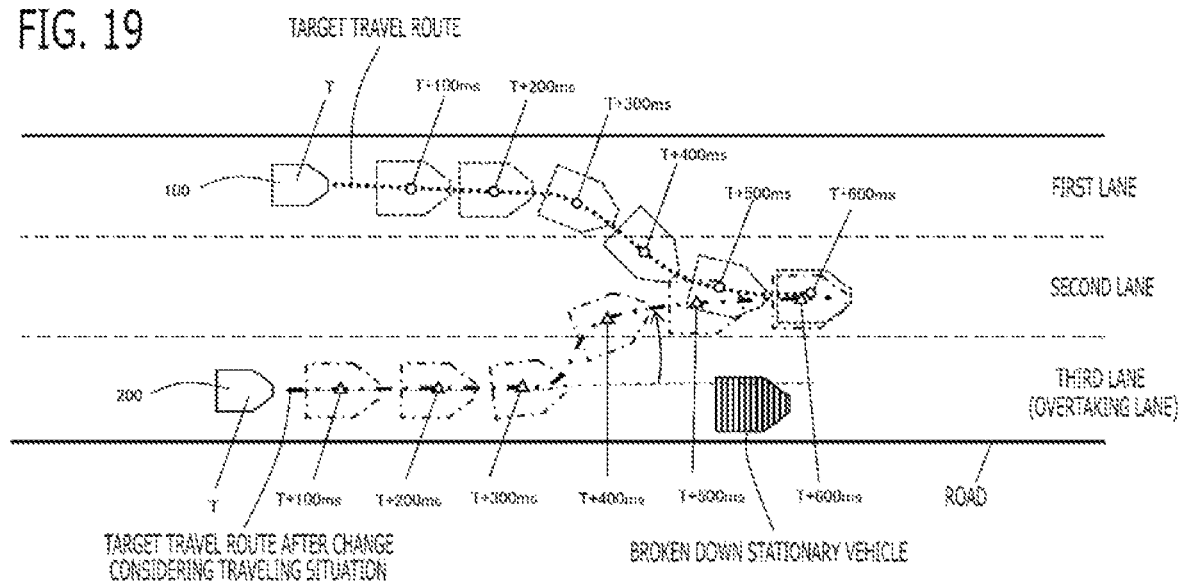
FIG. 19 is a schematic view for describing a travel route determination according to the second embodiment.
Figure 20:
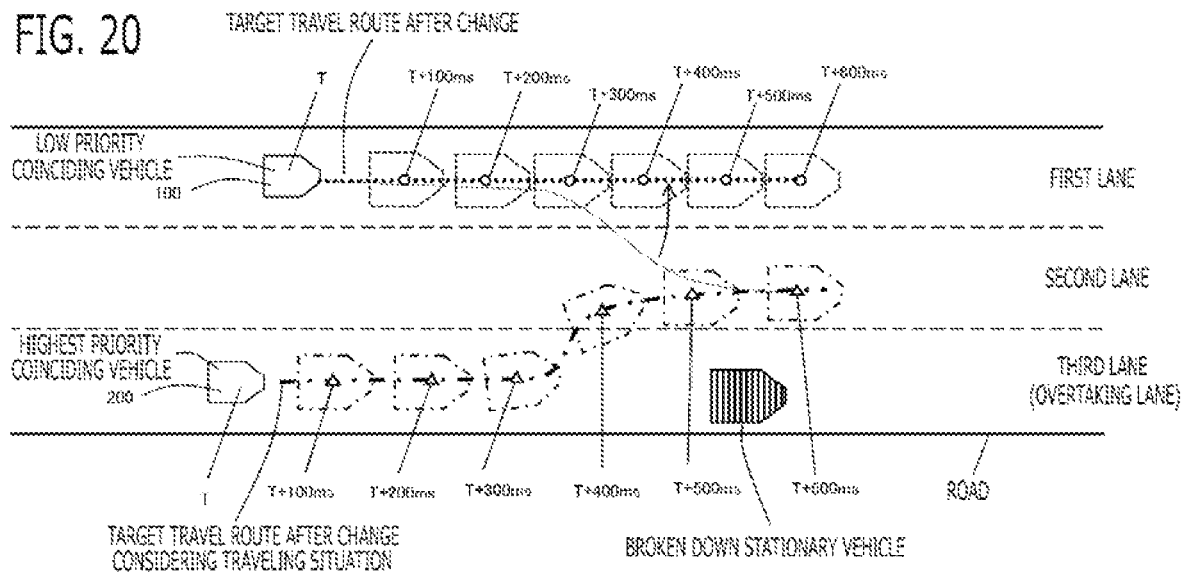
FIG. 20 is a schematic view for describing a travel route determination according to the second embodiment.

As shown in FIG. 19, the traveling situation consideration unit 48, in consideration of the broken down stationary vehicle, has changed the target travel route of the second vehicle 200 in such a way as to avoid the broken down stationary vehicle. That is, the traveling situation consideration unit 48 has changed to a target travel route of the second vehicle 200 that starts a lane change to the left-hand lane 300 ms after the current time T (T+300 ms), which is before the broken down stationary vehicle. Meanwhile, the traveling situation consideration unit 48 has not carried out a change of the target travel route of the first vehicle 100. As a result of this, the position of the first vehicle 100 and the position of the second vehicle 200 coincide with each other 400 ms after the current time T (T+400 ms) in accompaniment to the lane changes by the first vehicle 100 and the second vehicle 200.

Further, the priority determining unit 43 determines priority between the second vehicle 200 and the first vehicle 100 after the changing process carried out by the traveling situation consideration unit 48. The second vehicle 200 avoids an obstacle ahead of the vehicle, meaning that rule 1 is satisfied, and 10 points are added to the evaluation points of the second vehicle 200. As a result of this, the priority of the second vehicle 200 is higher than the priority of the first vehicle 100. Therefore, the second vehicle 200 is determined to be the highest priority coinciding vehicle, and the first vehicle 100 is determined to be a low priority coinciding vehicle.

As shown in FIG. 20, the route command unit 44 transmits a lane maintaining command to maintain the current traveling lane to the first vehicle 100 in order to avoid the target travel route of the second vehicle 200 after the change. The first vehicle 100 sets a travel route that maintains the current traveling lane, and maintains travel in the current traveling lane. Meanwhile, the route command unit 44 transmits the target travel route after the change carried out by the traveling situation consideration unit 48 to the second vehicle 200, which is the highest priority coinciding vehicle. The second vehicle 200 carries out self-driving in accordance with the received target travel route after the change. Therefore, as shown in FIG. 20, a route determination is carried out based on the target travel route after the changing process carried out by the traveling situation consideration unit 48, and the obstacle recognized by the lane change route instructing device 1 is avoided, because of which each vehicle can be caused to carry out a smooth traveling operation.

In the same way as in the first embodiment, even supposing that a target travel route change is not carried out by the traveling situation consideration unit 48, the second vehicle 200 changes to a target travel route that avoids a broken down stationary vehicle at the point at which the broken down stationary vehicle is recognized by the periphery monitoring device 25a, in response to which the lane change route instructing device 1 determines what the travel route of each vehicle is to be, meaning that no serious problem occurs. However, there is a possibility that traveling operation smoothness will worsen slightly due to the first vehicle 100 canceling a lane change, returning to the original lane, or the like, after starting the lane change.

Lane Change Route Instructing Device 1 Flowchart

Figure 21:
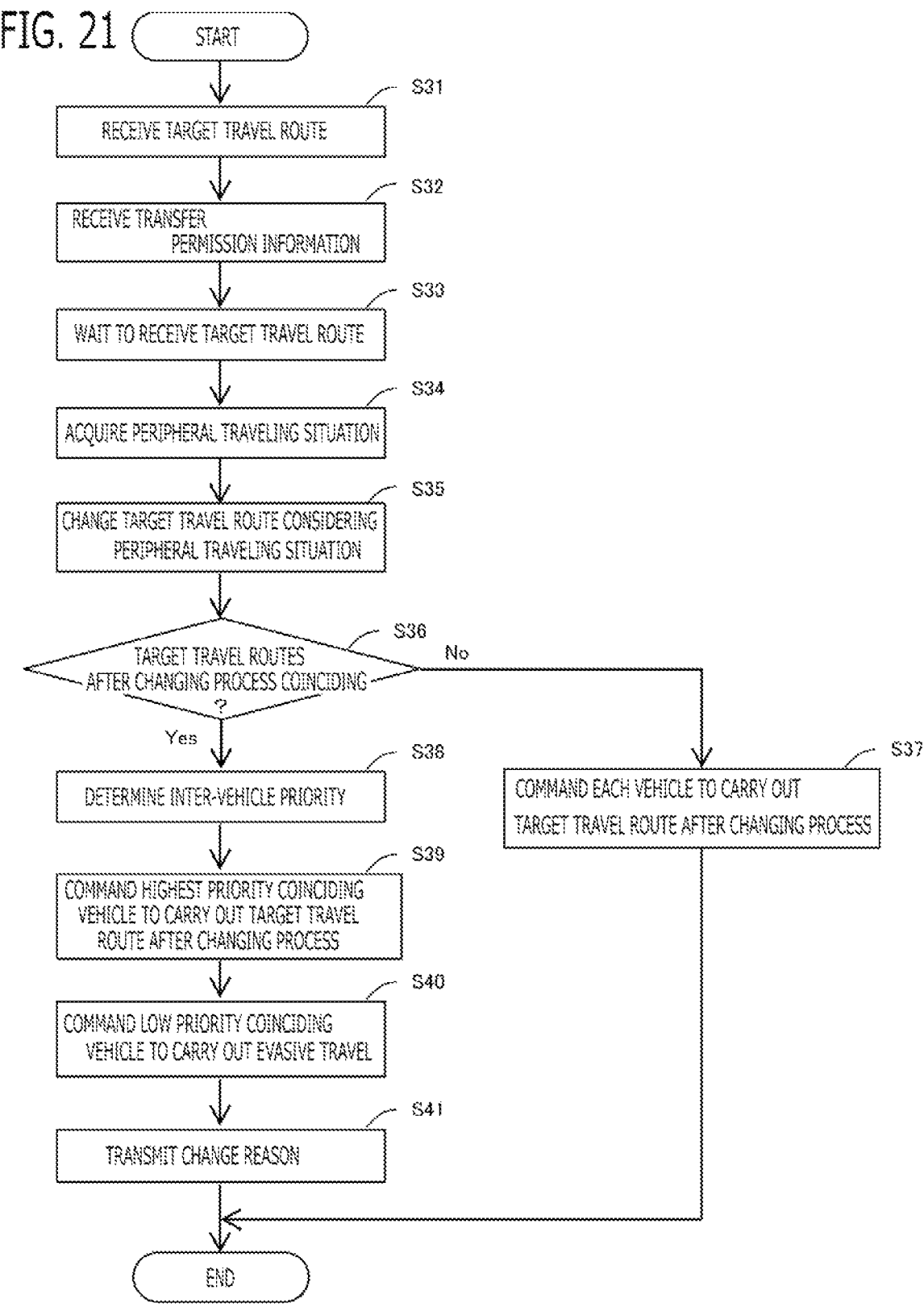
FIG. 21 is a flowchart illustrating a process of the lane change route instructing device according to the second embodiment.

Next, a process of the lane change route instructing device 1 according to the present embodiment will be described, using a flowchart of FIG. 21. A process of the flowchart of FIG. 21 is, for example, executed repeatedly every constant computing cycle.

In step S31, in the same way as in the first embodiment, the target route receiving unit 41 receives a target travel route from each vehicle via the communication unit 40. Also, in step S32, the transfer information receiving unit 47 receives transfer permission information from each vehicle. In step S33, the determination delay unit 45 causes a determination by the route coinciding determining unit 42 to be delayed until a target travel route is received from each vehicle.

In step S34, as heretofore described, the traveling situation consideration unit 48 acquires a peripheral traveling situation from a road monitoring system, each vehicle, and the like via the communication unit 40. In step S35, as heretofore described, the traveling situation consideration unit 48 changes the received target travel route of each vehicle with consideration to the peripheral traveling situation.

Further, in step S36, the route coinciding determining unit 42 determines whether or not the target travel routes of each vehicle after the changing process carried out by the traveling situation consideration unit 48 will coincide with each other in accompaniment to a lane change, proceeds to step S38 when determining that there will be a coinciding, and proceeds to step S37 when determining that there will be no coinciding. The route coinciding determining unit 42 carries out a coinciding determination, using the received target travel route, for a vehicle whose target travel route has not been changed by the traveling situation consideration unit 48. In step S37, the route command unit 44, via the communication unit 40, transmits a command regarding the target travel route after the change to a vehicle whose target travel route has been changed by the traveling situation consideration unit 48, and transmits a command to maintain the target travel route to a vehicle whose target travel route has not been changed by the traveling situation consideration unit 48.

Meanwhile, in step S38, the priority determining unit 43 determines inter-vehicle priority based on the target travel route of each vehicle after the changing process carried out by the traveling situation consideration unit 48. The priority determining unit 43 determines the priority of a vehicle whose target travel route has not been changed by the traveling situation consideration unit 48 based on the received target travel route. Further, in step S39, the route command unit 44 transmits a command regarding the target travel route after the change to the highest priority coinciding vehicle, among coinciding vehicles whose target travel routes after the changing process have been determined to be going to coincide with each other, when the target travel route has been changed by the traveling situation consideration unit 48, and transmits a command to maintain the target travel route when the target travel route has not been changed by the traveling situation consideration unit 48.

In step S40, the route command unit 44 transmits a command via the communication unit 40 to a low priority coinciding vehicle for evasive travel that avoids coinciding with the target travel route of the highest priority coinciding vehicle after the changing process. For example, the route command unit 44 carries out the kinds of process of the first case to the fourth case of the first embodiment. When fixing a low priority coinciding vehicle evasive travel route, the route command unit 44 takes the traveling situation in the periphery of the low priority coinciding vehicle into consideration. Also, the route command unit 44 fixes an evasive travel route that accompanies a vehicle deceleration or acceleration.

In step S41, the change reason transmitting unit 46 transmits a reason for the target travel route being changed, via the communication unit 40, to a low priority coinciding vehicle whose target travel route is to be changed. When the target travel route of the highest priority coinciding vehicle has been changed by the traveling situation consideration unit 48, the change reason transmitting unit 46 transmits a reason for change such as "The travel route is to be changed in consideration of the peripheral traveling situation" to the highest priority coinciding vehicle.

3. Third Embodiment

Next, a lane change route instructing system according to a third embodiment will be described. A description of a configuration portion the same as in the first and second embodiments will be omitted. A basic configuration and process of the lane change route instructing system according to the present embodiment are the same as in the first and second embodiments. In the present embodiment, a point that a travel route determination is carried out for each small group differs from the first and second embodiments.

Figure 22:
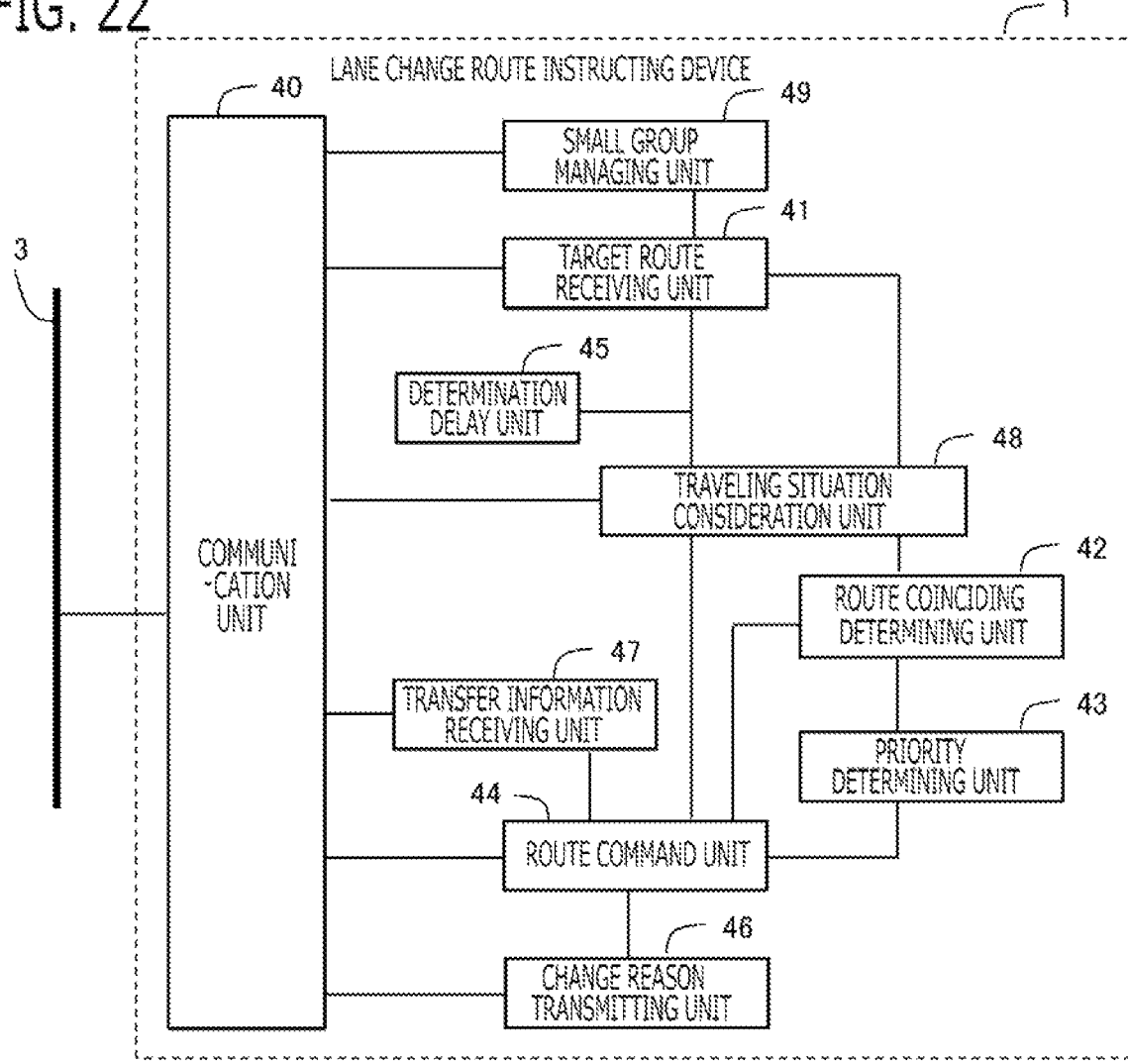
FIG. 22 is a schematic configuration drawing of a lane change route instructing device according to a third embodiment.

FIG. 22 shows a schematic configuration drawing of the lane change route instructing device 1 according to the present embodiment. In addition to the communication unit 40 to the traveling situation consideration unit 48, the lane change route instructing device 1 further includes a small group managing unit 49.

When the lane change route instructing device 1 processes the travel routes of all managed vehicles at one time, there is a problem in that an amount of arithmetic processing carried out at one time increases. Also, when a vehicle with high latency is included, there is a possibility that this will adversely affect an overall travel route computation.

Therefore, the small group managing unit 49 fixes a small group formed of one or more vehicles whose distances are close. Further, the route coinciding determining unit 42 determines, for each small group, whether or not vehicle target travel routes will coincide with each other in accompaniment to a lane change. The priority determining unit 43 determines inter-vehicle priority for each small group. The route command unit 44, for each small group, carries out a determination of what a travel route of each vehicle is to be in such a way that travel routes do not coincide with each other, with consideration to the inter-vehicle priority.

According to this configuration, travel routes can be appropriately determined for each small group wherein distances are close and travel routes affect each other. Vehicles outside the small group, whose distances are long and whose travel routes do not affect each other, can be excluded from the travel route determination, whereby the determination process can be facilitated. Because of this, the amount of arithmetic processing carried out at one time can be reduced, and even when a vehicle with high latency is included in a certain small group, an adverse effect on computing the travel routes of another small group can be restricted.

In the present embodiment, the small group managing unit 49 fixes a small group formed of one or a multiple of vehicles whose distance, speed, and direction of travel are closer than a determination value, based on a position, a traveling speed, a direction of travel, and the like, received from each vehicle. For example, the small group managing unit 49 fixes one or more vehicles wherein an inter-vehicle distance is within a determination distance, an inter-vehicle difference in direction of travel is within a determination angle difference, and an inter-vehicle difference in speed is within a determination speed difference, as one small group. When the inter-vehicle distance is equal to or greater than the determination distance, the small group managing unit 49 sets a limit of the small group at that inter-vehicle distance. Vehicles traveling in the same direction in one or a multiple of lanes can be selected by determining the direction of travel and the speed.

Alternatively, the small group managing unit 49 may fix a small group formed of one or more vehicles within a specific range on a road, based on positional information and the like received from each vehicle. For example, the small group managing unit 49 determines one or more vehicles existing on the same road link to be one small group, based on road map data and positional information relating to each vehicle. A road link is a road section between nodes such as freeway ramps or intersections. A section such that a road link is divided into appropriate lengths may also be seen as a road link. A lane change may be dangerous, or a lane change may be prohibited by a traffic rule, in a vicinity of a freeway ramp or a vicinity of an intersection. Because of this, a vehicle existing at this kind of road converging point may be excluded from a small group. Alternatively, one or more vehicles existing at this kind of road converging point may be determined to be one small group.

As described in the first embodiment, a multiple of the lane change route instructing device 1 are provided, and the travel routes of a multiple of vehicles are divided among the multiple of lane change route instructing devices 1 and managed. One or more vehicles in the same small group are managed by the same lane change route instructing device 1.

Figures 23, 24:
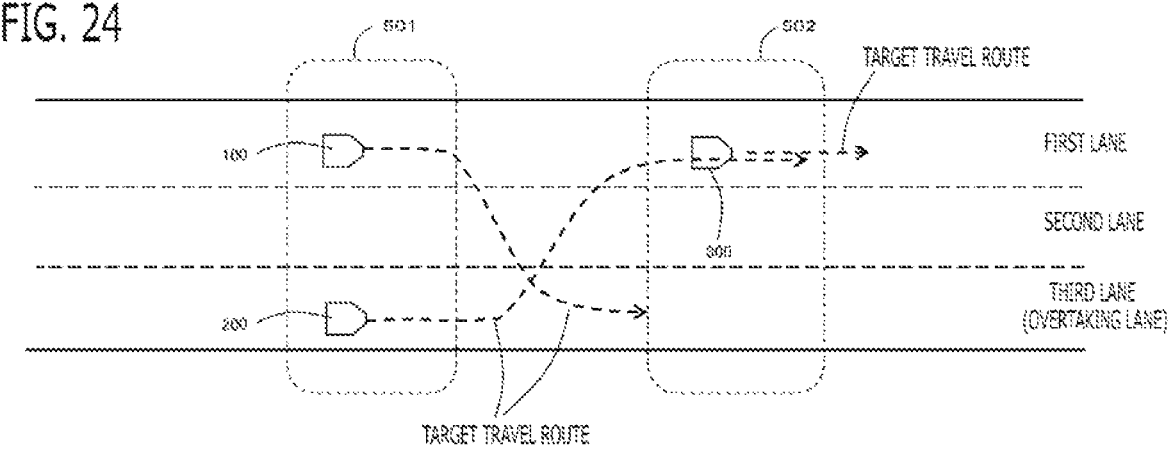
FIG. 23 is a drawing for describing a small group list according to the third embodiment.
FIG. 24 is a schematic view for describing a travel route determination according to the third embodiment.

The small group managing unit 49 compiles and updates a small group list whenever determining that there is a small group. A small group list is, for example, a kind of list shown in FIG. 23 showing a small group identification code and a correspondence relationship between a vehicle and the identification code.

Peripheral Small Group Consideration

A case wherein a travel route determination result affects both a small group and a peripheral small group is conceivable. Therefore, in the present embodiment, the route coinciding determining unit 42 adopts a small group for which a determination is to be carried out as a determination subject small group, and determines whether or not the travel routes of the vehicles in the determination subject small group will coincide with the travel routes of the vehicles in a small group in the periphery of (for example, ahead or behind) the determination subject small group. When it is determined that there will be a coinciding with the travel routes of the peripheral small group, the priority determining unit 43 determines inter-vehicle priority with consideration to the vehicles of the peripheral small group with which it has been determined that there will be a coinciding. When it is determined that there will be no coinciding with the travel routes of the peripheral small group, the priority determining unit 43 determines inter-vehicle priority in the determination subject small group.

Further, when it is determined that there will be a coinciding with the travel routes of the peripheral small group, the route command unit 44 changes the travel route of a vehicle with which it has been determined that there will be a coinciding in such a way that there is no coinciding, with consideration to the inter-vehicle priority. When it is determined that there will be no coinciding with the travel routes of the peripheral small group, the priority determining unit 43 carries out a determination of what the travel route of each vehicle in the determination subject small group is to be in order that the travel routes do not coincide with each other, with consideration to the inter-vehicle priority. According to this configuration, travel routes can be determined in such a way as not to coincide with the travel routes of a peripheral small group, even when determining travel routes for each small group.

A description will be given using examples of FIG. 24 and FIG. 25. In the example of FIG. 24, the first vehicle 100 and the second vehicle 200 are determined to be a first small group 501, as the distances, speeds, and directions of travel are close, and the third vehicle 300 is determined to be a second small group 502, as the distance between the first vehicle 100 or the second vehicle 200 and the third vehicle 300 is equal to or greater than a determination distance.

However, the target travel route of the second vehicle 200 approaches the target travel route of the third vehicle 300, because of which the second vehicle 200 will need to reduce speed sharply after changing lane. Therefore, the route coinciding determining unit 42 determines that the travel route of the second vehicle 200 of the first small group 501 will coincide with the travel route of the third vehicle 300 of the second small group 502, and the route command unit 44 changes the travel route of the second vehicle 200 in such a way as not to coincide with the travel route of the third vehicle 300, as shown in FIG. 25.

The example of FIG. 25 is such that when considering only the first small group 501, the second vehicle 200 has a higher priority than the first vehicle 100, but the priority determining unit 43 takes the third vehicle 300 into consideration, lowers the priority of the second vehicle 200, and determines that the first vehicle 100 has a higher priority than the second vehicle 200. Further, the route command unit 44 determines that the target travel route of the first vehicle 100 is to be maintained, and fixes an evasive travel route of the second vehicle 200 that carries out a lane change while avoiding the target travel route of the first vehicle 100 and the target travel route of the third vehicle 300. Specifically, the evasive travel route is such that the second vehicle 200 is caused to reduce speed, and the second vehicle 200 is caused to change lane after the first vehicle 100 is caused to change lane first. By considering travel routes between small groups in this way, each vehicle can be caused to carry out a smoother traveling operation.

Figure 27:
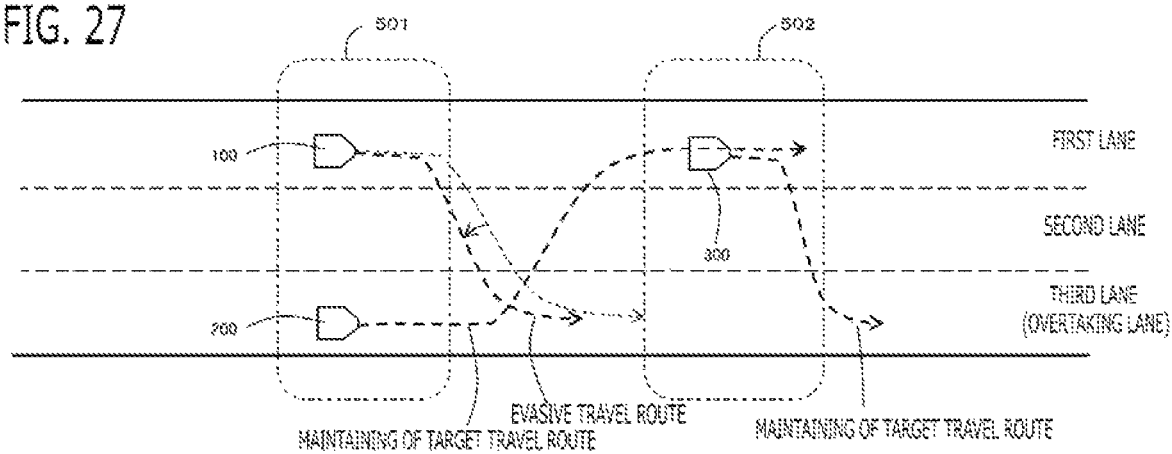
FIG. 27 is a schematic view for describing a travel route determination according to the third embodiment.

Next, a description will be given using examples of FIG. 26 and FIG. 27. In the example of FIG. 26, in the same way as in the example of FIG. 24, the first vehicle 100 and the second vehicle 200 are determined to be the first small group 501, and the third vehicle 300 is determined to be the second small group 502.

Unlike the example of FIG. 24, the third vehicle 300 carries out a lane change, because of which the target travel route of the second vehicle 200 does not approach the target travel route of the third vehicle 300. Because of this, the second vehicle 200 can travel without change after changing lane. Therefore, the route coinciding determining unit 42 determines that the travel routes of the vehicles of the first small group 501 and the travel route of the vehicle of the second small group 502 will not coincide.

Further, considering only the first small group 501, the priority determining unit 43 determines that the second vehicle 200 has a higher priority than the first vehicle 100. Further, as shown in FIG. 27, the route command unit 44 determines that the target travel route of the second vehicle 200 is to be maintained, and fixes an evasive travel route of the first vehicle 100 that carries out a lane change while avoiding the target travel route of the second vehicle 200. Specifically, the evasive travel route is such that the first vehicle 100 is caused to reduce speed, and the first vehicle 100 is caused to change lane after the second vehicle 200 is caused to change lane first.

As another example of FIG. 24 and FIG. 25, when the second vehicle 200 is a high priority vehicle, as in the case of an emergency vehicle or the like, the travel route of the second vehicle 200 should be prioritized over that of the third vehicle 300. Because of this, the route coinciding determining unit 42 determines whether or not the travel routes of the vehicles in the determination subject small group will coincide with the travel routes of the vehicles in a small group in the periphery of the determination subject small group. When it is determined that there will be a coinciding with the travel routes of the peripheral small group, the priority determining unit 43 may determine priority between the vehicles whose travel routes coincide between the small groups. When it is determined that there will be a coinciding with the travel routes of the peripheral small group, the route command unit 44 may change the travel route of a vehicle with lower priority, among vehicles whose travel routes coincide between the small groups, in such a way as not to coincide with the travel route of a vehicle with higher priority.

Figure 28:
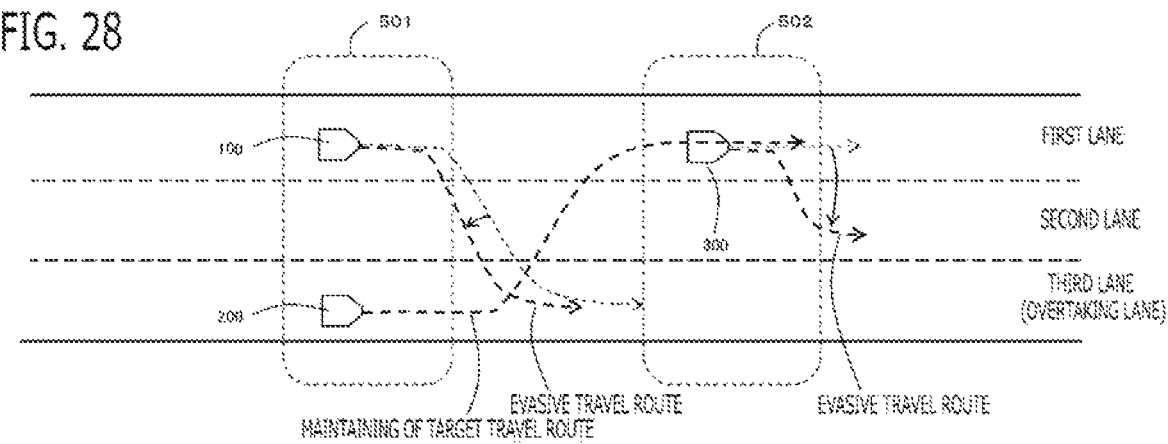
FIG. 28 is a schematic view for describing a travel route determination according to the third embodiment.

In this case, in the example of FIG. 24, the priority determining unit 43 determines priority between the second vehicle 200 of the first small group 501 and the third vehicle 300 of the second small group 502, whose target travel routes coincide with each other, and determines that the second vehicle 200 has higher priority than the third vehicle 300. Further, as shown in FIG. 28, the route command unit 44 determines that the second vehicle 200, which has higher priority, is to maintain the target travel route, and fixes an evasive travel route for the third vehicle 300, which has lower priority, such that a lane change is carried out in order to avoid the target travel route of the second vehicle 200. Also, the route command unit 44 fixes an evasive travel route for the first vehicle 100 such that a lane change is carried out while avoiding the target travel route of the second vehicle 200. By considering priority between small groups in this way, a vehicle with high priority between small groups can be caused to travel with priority.

Lane Change Route Instructing Device 1 Flowchart

Figure 29:
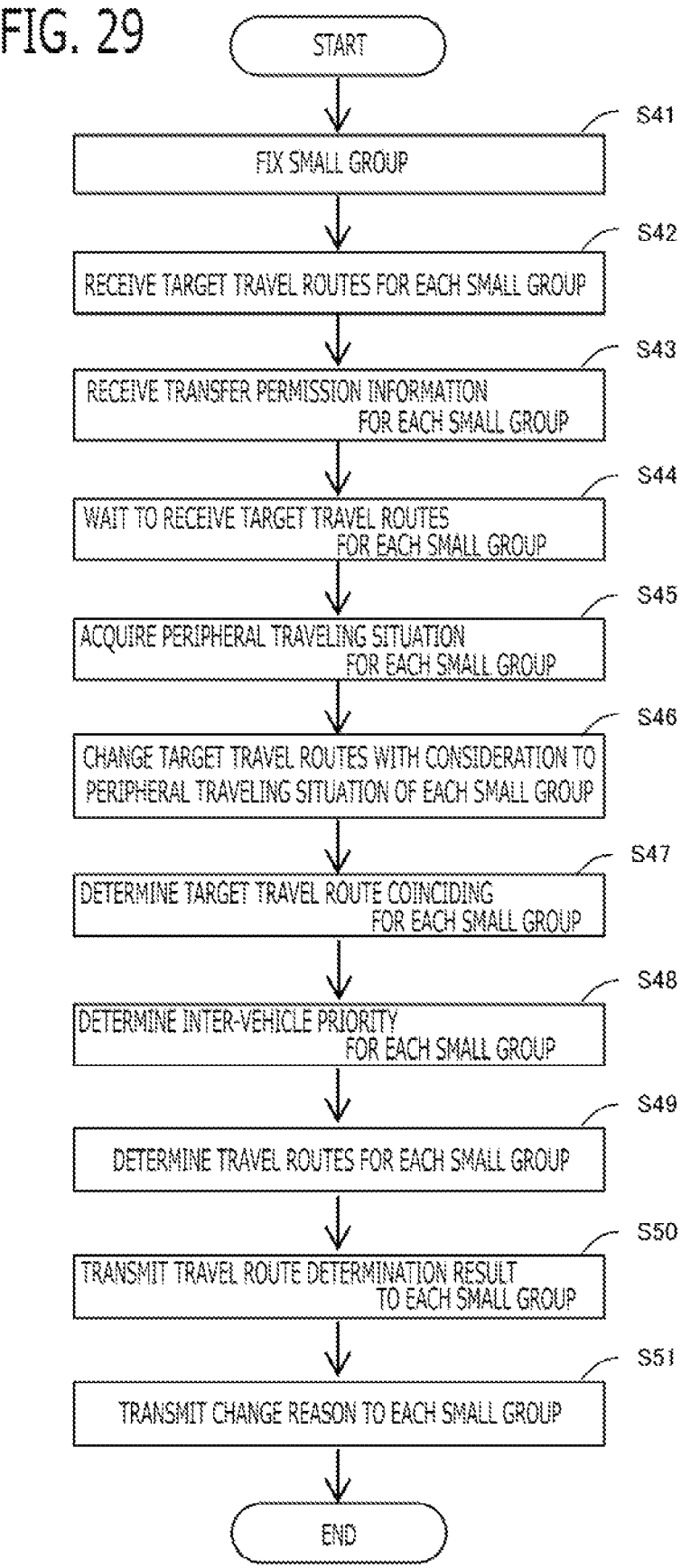
FIG. 29 is a flowchart illustrating a process of the lane change route instructing device according to the third embodiment.

Next, a process of the lane change route instructing device 1 according to the present embodiment will be described, using a flowchart of FIG. 29. A process of the flowchart of FIG. 29 is, for example, executed repeatedly every constant computing cycle.

In step S41, as heretofore described, the small group managing unit 49 fixes a small group formed of one or more vehicles whose distances are close, based on positional information and the like received from each vehicle that is a management subject via the communication unit 40.

In step S42, the target route receiving unit 41 receives a target travel route from each vehicle in each small group via the communication unit 40. At this time, the target route receiving unit 41 also receives a target travel route from each vehicle in a peripheral small group. Also, in step S43, the transfer information receiving unit 47 receives transfer permission information from each vehicle in each small group.

In step S44, the determination delay unit 45 causes a determination by the route coinciding determining unit 42 to be delayed until a target travel route is received from each vehicle in the same small group.

In step S45, the traveling situation consideration unit 48 acquires a peripheral traveling situation from a road monitoring system, each vehicle, and the like for each small group via the communication unit 40. In step S46, the traveling situation consideration unit 48 changes the received target travel route of each vehicle in each small group, with consideration to the peripheral traveling situation.

Further, in step S47, the route coinciding determining unit 42 determines whether or not the target travel routes of each vehicle in each small group will coincide with each other in accompaniment to a lane change. In the present embodiment, the route coinciding determining unit 42 adopts a small group for which a determination is to be carried out as a determination subject small group, and determines whether or not the target travel routes of the vehicles in the determination subject small group will coincide with the travel routes of the vehicles in a small group in the periphery of the determination subject small group.

In step S48, the priority determining unit 43 determines inter-vehicle priority in each small group. The present embodiment is such that when it is determined that there will be a coinciding with the travel routes of the peripheral small group, the priority determining unit 43 determines inter-vehicle priority with consideration to the vehicles of the peripheral small group with which it has been determined that there will be a coinciding. At this time, the priority determining unit 43 may determine priority between vehicles whose travel routes coincide between the small groups.

In step S49, the route command unit 44 carries out a determination of what a travel route of each vehicle in each small group is to be in such a way that travel routes do not coincide with each other, with consideration to the inter-vehicle priority. The present embodiment is such that when it is determined that there will be a coinciding with the travel routes of the peripheral small group, the route command unit 44 changes the vehicle travel routes determined to be going to coincide in such a way as not to coincide, with consideration to the inter-vehicle priority. At this time, the route command unit 44 may change the travel route of a vehicle with lower priority, among vehicles whose travel routes coincide between small groups, in such a way as not to coincide with the travel route of a vehicle with higher priority.

Further, in step S50, the route command unit 44 transmits a travel route determination result to each vehicle in each small group. In step S51, the change reason transmitting unit 46 transmits a reason for change to each vehicle whose target travel route is to be changed in each small group.

4. Fourth Embodiment

Next, a lane change route instructing system according to a fourth embodiment will be described. A description of a configuration portion the same as in the first, second, and third embodiments will be omitted. A basic configuration and process of the lane change route instructing system according to the present embodiment are the same as in the first, second, and third embodiments. In the present embodiment, a point that the lane change route instructing device 1 is mounted in a vehicle differs from the first, second, and third embodiments.

Figure 30:
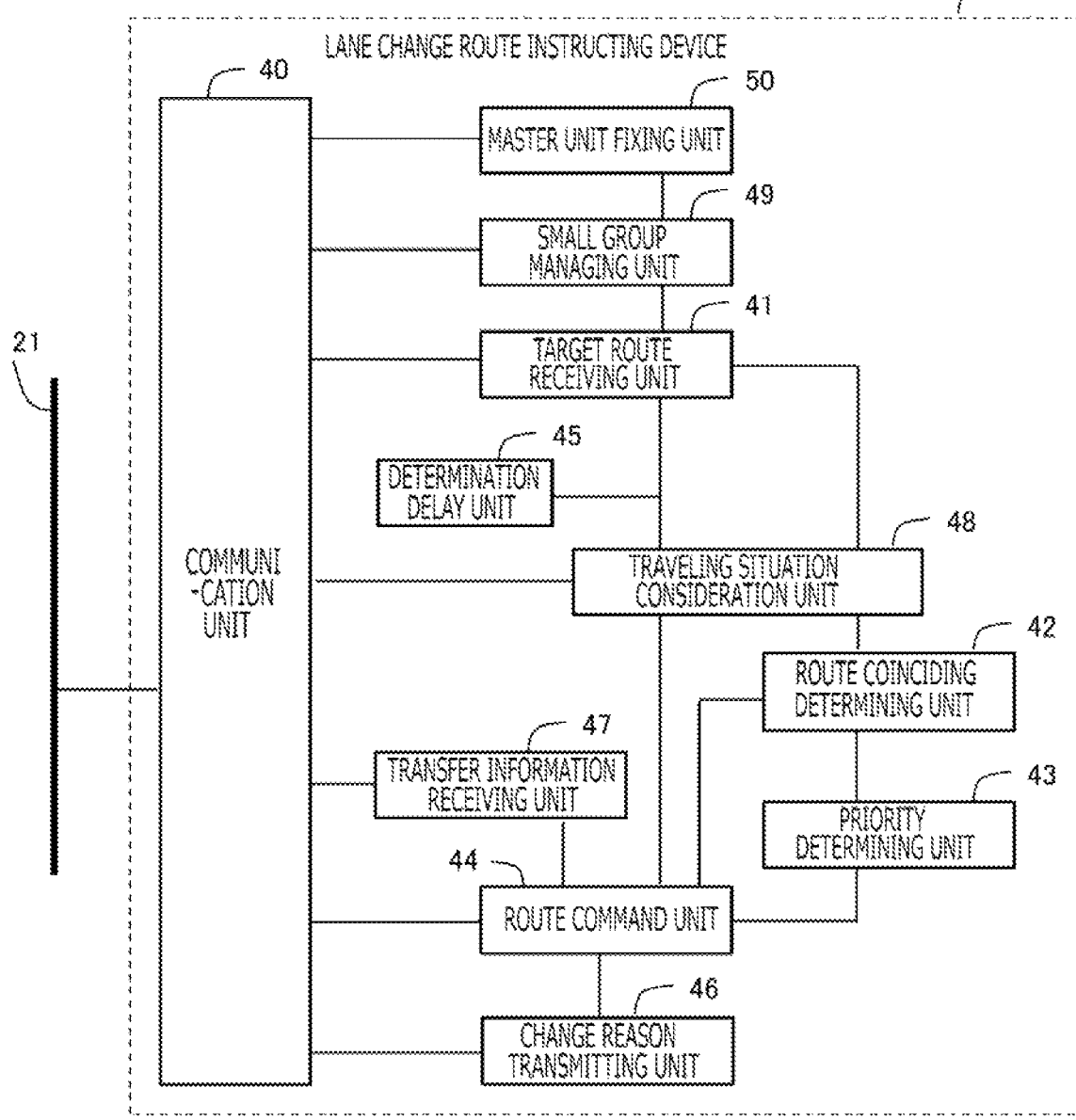
FIG. 30 is a schematic configuration drawing of a lane change route instructing device according to a fourth embodiment.

FIG. 30 shows a schematic configuration drawing of the lane change route instructing device 1 according to the present embodiment. In addition to the communication unit 40 to the small group managing unit 49, the lane change route instructing device 1 further includes a master unit fixing unit 50.

In the present embodiment, the lane change route instructing device 1 is mounted in each vehicle. The master unit fixing unit 50 fixes a master unit that is to operate among a plurality of peripheral vehicles in which the lane change route instructing device 1 is mounted. Further, when determining that the lane change route instructing device 1 itself is a master unit, the lane change route instructing device 1 manages the travel routes of the plurality of peripheral vehicles.

This configuration is such that, rather than each vehicle depending on the lane change route instructing device 1 provided in a server, as is the case in the first to third embodiments, a master unit is fixed among vehicles in which the lane change route instructing device 1 is mounted, and inter-vehicle communication is carried out, whereby an inter-vehicle management of travel routes can be carried out autonomously.

In the present embodiment, the lane change route instructing device 1 (the communication unit 40) of each vehicle carries out wireless communication with the lane change route instructing device 1 of a peripheral vehicle. The lane change route instructing device 1 of each vehicle may carry out wireless communication with the lane change route instructing device 1 of a peripheral vehicle via a base station. Also, as the communication device 72 is connected to the vehicle-mounted network 21, the lane change route instructing device 1 may be connected to the self-driving control device 25, the communication device 22, and the like, via the vehicle-mounted network 21, and may carry out wireless communication with the lane change route instructing device 1 of a peripheral vehicle using the communication device 72, which is adopted as a wireless communication device.

The master unit fixing unit 50 exchanges a master unit management list of vehicle ID, area ID, master unit ID, and the like, with the lane change route instructing device 1 (the master unit fixing unit 50) of each vehicle existing in the periphery, and manages setting of a master unit and a slave unit. Vehicle ID is an identification code for identifying a vehicle, area ID is an identification code of a region in which a vehicle is positioned, and master unit ID is an identification code of the lane change route instructing device 1 that is the master unit. The master unit fixing unit 50 of an arbitrary vehicle may fix the lane change route instructing device 1 that is to be the master unit randomly from among vehicles existing in the same management region, or may fix upon a vehicle that exists in a vicinity of a center of the same management region. Also, when the vehicle set as the master unit departs from the management region, the master unit fixing unit 50 transmits departure information to the peripheral lane change route instructing devices 1, and transfers the master unit to another lane change route instructing device 1.

In the same way as in the first to third embodiments, the lane change route instructing device 1 set as the master unit receives a target travel route and the like from the self-driving control device 25 of each vehicle positioned in the same management region, and after determining what the travel route of each vehicle is to be, transmits a travel route determination result and the like to the self-driving control device 25 of each vehicle. The lane change route instructing device 1 set as the master unit acquires information from a road monitoring system or the like via a base station. Meanwhile, the lane change route instructing device 1 of each vehicle that is not set as the master unit stops functions other than the master unit fixing unit 50 that manages master unit setting. Also, the self-driving control device 25 of each vehicle that is not set as the master unit transmits a target travel route and the like to the lane change route instructing device 1 of the vehicle set as the master unit, and receives a travel route determination result and the like from the lane change route instructing device 1 of the vehicle set as the master unit.

OTHER EMBODIMENTS

Lastly, other embodiments of the present disclosure will be described. A configuration of each embodiment described hereafter, not being limited to being applied independently, can also be applied combined with a configuration of another embodiment, provided that no inconsistency occurs.

(1) In each of the heretofore described embodiments, a case wherein the lane change route instructing device 1 includes the determination delay unit 45, which causes a determination by the route coinciding determining unit 42, to be described hereafter, to be delayed until a target travel route is received from each vehicle is described as an example. However, the embodiments of the present disclosure are not limited to this. That is, the lane change route instructing device 1 need not necessarily include the determination delay unit 45, and the processes of the route coinciding determining unit 42, the priority determining unit 43, and the route command unit 44 may be carried out using a latest target travel route received from each vehicle at each computation timing.

(2) In each of the heretofore described embodiments, a case wherein the lane change route instructing device 1 includes the change reason transmitting unit 46 and the transfer information receiving unit 47 is described as an example. However, the embodiments of the present disclosure are not limited to this. That is, the lane change route instructing device 1 need not include one or either of the change reason transmitting unit 46 and the transfer information receiving unit 47.

(3) In the heretofore described third and fourth embodiments, a case wherein the lane change route instructing device 1 includes the traveling situation consideration unit 48, which changes the received target travel route of each vehicle with consideration to the peripheral traveling situation, and the route coinciding determining unit 42 and the priority determining unit 43 carry out a determination using the target travel routes after the changing process carried out by the traveling situation consideration unit 48, is described as an example. However, the heretofore described third and fourth embodiments are such that the lane change route instructing device 1 need not include the traveling situation consideration unit 48, and the route coinciding determining unit 42 and the priority determining unit 43 may carry out a determination using the received target travel routes.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST 1 lane change route instructing device, 2 server, 3 network, 40 communication unit, 41 target route receiving unit, 42 route coinciding determining unit, 43 priority determining unit, 44 route command unit, 45 determination delay unit, 46 change reason transmitting unit, 47 transfer information receiving unit, 48 traveling situation consideration unit, 49 small group managing unit, 50 master unit fixing unit

The invention claimed is:

1. A lane change route instructing device, comprising at least one processor; and
   at least one memory including computer program code, which when executed, causes the at least one processor to:
   communicate with a multiple of vehicles;
   receive a target travel route from each vehicle;
   determine whether or not the target travel routes of each vehicle will coincide with each other in accompaniment to a lane change;
   determine inter-vehicle priority relating to a lane change; and
   transmit a travel route command to each vehicle, comprising,
   when it is determined that a coinciding of the target travel routes will occur, transmitting a command to maintain the target travel route to a highest priority coinciding vehicle, which is a vehicle for which the priority is highest among coinciding vehicles whose target travel routes have been determined to be going to coincide with each other, and transmitting a command for evasive travel that avoids a coinciding with the target travel route of the highest priority coinciding vehicle to a low priority coinciding vehicle, which is a vehicle other than the highest priority coinciding vehicle among the coinciding vehicles, wherein based on the travel route of the low priority vehicle including a lane change, the command for evasive travel includes a command to reduce speed and subsequently perform the lane change.

2. The lane change route instructing device according to claim 1, wherein transmitting the travel route command comprises transmitting a lane maintaining command to maintain a current traveling lane to the low priority coinciding vehicle when a coinciding of the target travel routes will occur in accompaniment to a lane change by the low priority coinciding vehicle.

3. The lane change route instructing device according to claim 1, wherein transmitting the travel route command comprises fixing an evasive travel route of the low priority coinciding vehicle that avoids the target travel route of the highest priority coinciding vehicle, and transmitting a command for the evasive travel route to the low priority coinciding vehicle when it is determined that a coinciding of the target travel routes will occur.

4. The lane change route instructing device according to claim 3, further comprising considering a traveling situation in a periphery of the low priority coinciding vehicle when fixing the evasive travel route of the low priority coinciding vehicle.

5. The lane change route instructing device according to claim 3, further comprising fixing the evasive travel route that accompanies an acceleration or a deceleration of a vehicle.

6. The lane change route instructing device according to claim 1, wherein transmitting the travel route command comprises fixing an evasive travel route of the low priority coinciding vehicle that carries out a lane change while avoiding the target travel route of the highest priority coinciding vehicle, and transmitting a command for the evasive travel route to the low priority coinciding vehicle when a coinciding of the target travel routes will occur in accompaniment to a lane change by the low priority coinciding vehicle.

7. The lane change route instructing device according to claim 1, further comprising fixing evasive travel routes from the low priority coinciding vehicle for which the priority is higher in such a way that a travel route of the low priority coinciding vehicle for which the priority is lower avoids a travel route of the low priority coinciding vehicle for which the priority is higher, while avoiding the target travel route of the highest priority coinciding vehicle, and transmitting a command for the evasive travel route to each of the low priority coinciding vehicles when there are a multiple of the low priority coinciding vehicle, the route commander.

8. The lane change route instructing device according to claim 1, further comprising determining the priority between vehicles by combining a multiple of rules relating to at least a necessity of a lane change.

9. The lane change route instructing device according to claim 1, further comprising delaying determination of whether or not the target travel routes of each vehicle will coincide with each other until the target travel route is received from each vehicle.

10. The lane change route instructing device according to claim 1, further comprising transmitting a reason the target travel route is to be changed to the low priority coinciding vehicle.

11. The lane change route instructing device according to claim 1, further comprising receiving transfer permission information indicating that a travel route may be transferred to another vehicle from each vehicle, wherein
    determining inter-vehicle priority comprises setting the priority of a vehicle that has received the transfer permission information to be lower than the priority of a vehicle that has not received the transfer permission information.

12. The lane change route instructing device according to claim 1, further comprising changing the received target travel route with consideration to a peripheral traveling situation, and
    when the target travel route after the changing process is to be maintained transmitting a command for the target travel route after the changing process to a corresponding vehicle.

13. The lane change route instructing device according to claim 1, further comprising fixing a small group formed of one or more vehicles whose distances are close;
    determining, for each small group, whether or not the target travel routes of each vehicle will coincide with each other in accompaniment to a lane change,
    determining priority between vehicles for each small group, and determining a travel route of each vehicle such that the travel routes do not coincide with each other, with consideration to the priority between vehicles, for each small group.

14. The lane change route instructing device according to claim 13, further comprising selecting the small group for which a determination is to be carried out as a determination subject small group, and determining whether or not target travel routes of each vehicle in the determination subject small group will coincide with travel routes of each vehicle in the small group in a periphery of the determination subject small group, when it is determined that there will be a coinciding with the travel routes of a peripheral small group, determining priority between vehicles with consideration to the vehicles of the peripheral small group that have been determined to be going to coincide, and when it is determined that there will be a coinciding with the travel routes of the peripheral small group, changing vehicle travel routes that have been determined to be going to coincide in such a way as not to coincide, with consideration to the priority between vehicles.

15. The lane change route instructing device according to claim 13, further comprising selecting the small group for which a determination is to be carried out as a determination subject small group, and determining whether or not target travel routes of each vehicle in the determination subject small group will coincide with travel routes of each vehicle in the small group in a periphery of the determination subject small group, when it is determined that there will be a coinciding with the travel routes of a peripheral small group, determining priority between vehicles whose travel routes coincide between the small groups, and when it is determined that there will be a coinciding with the travel routes of the peripheral small group, changing the travel route of a vehicle having a lower priority among vehicles whose travel routes coincide between the small groups in such a way as not to coincide with the travel route of a vehicle having a higher priority.

16. The lane change route instructing device according to claim 13, further comprising fixing the small group formed of one or more vehicles whose distance, speed, and direction of travel are closer than a determination value, or fixing the small group formed of one or more vehicles within a specific range on a road.

17. The lane change route instructing device according to claim 1, wherein a multiple of the lane change route instructing device are provided, the multiple of lane change route instructing devices divide and manage travel routes of a multiple of vehicles, and manage each small group formed of one or more vehicles, and one or more vehicles of the same small group are managed by the same lane change route instructing device.

18. The lane change route instructing device according to claim 1, wherein the lane change route instructing device is provided in a server connected to a network.

19. The lane change route instructing device according to claim 1, wherein the lane change route instructing device is mounted in a vehicle, and further comprises fixing a master unit that operates among a multiple of peripheral vehicles in which the lane change route instructing device is mounted, and managing travel routes of the multiple of peripheral vehicles when it is determined that the lane change route instructing device itself is the master unit.

20. A lane change route instructing system, comprising:
the lane change route instructing device according to claim 1; and
a multiple of vehicles that fix the target travel route, transmit the target travel route to the lane change route instructing device, and carry out self-driving in accordance with the travel route command received from the lane change route instructing device.

21. A lane change route instructing device, comprising at least one processor; and
at least one memory including computer program code, which when executed, causes the at least one processor to:
communicate with a multiple of vehicles;
receive a target travel route from each vehicle;
determine whether or not the target travel routes of each vehicle will coincide with each other in accompaniment to a lane change; and
transmit a travel route command to each vehicle, wherein transmitting the travel route command comprises transmitting a command to maintain the target travel route to each vehicle when it is determined that a coinciding of the target travel routes will not occur.

* * * * *